(12) United States Patent
Zhang et al.

(10) Patent No.: US 11,855,694 B1
(45) Date of Patent: Dec. 26, 2023

(54) SYSTEMS AND METHODS FOR FULL FIELD TRANSCEPTION

(71) Applicant: CABLE TELEVISION LABORATORIES, INC., Louisville, CO (US)

(72) Inventors: Haipeng Zhang, Broomfield, CO (US); Mu Xu, Broomfield, CO (US); Junwen Zhang, Broomfield, CO (US); Zhensheng Jia, Superior, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/526,341

(22) Filed: Nov. 15, 2021

Related U.S. Application Data

(60) Provisional application No. 63/113,907, filed on Nov. 15, 2020.

(51) Int. Cl.
 *H04B 10/00* (2013.01)
 *H04B 10/50* (2013.01)
 *H04B 10/40* (2013.01)
 *H04B 10/548* (2013.01)
 *H04B 10/27* (2013.01)

(52) U.S. Cl.
 CPC ........... *H04B 10/503* (2013.01); *H04B 10/27* (2013.01); *H04B 10/40* (2013.01); *H04B 10/548* (2013.01)

(58) Field of Classification Search
 CPC ...... H04B 10/503; H04B 10/27; H04B 10/40; H04B 10/548
 See application file for complete search history.

(56) References Cited

U.S. PATENT DOCUMENTS

| | | | |
|---|---|---|---|
| 2003/0117998 A1* | 6/2003 | Sala .................. | H04Q 11/0067 370/392 |
| 2007/0166048 A1* | 7/2007 | Doerr .................... | H04B 10/60 398/158 |
| 2014/0355990 A1* | 12/2014 | Salleh ................ | H04B 10/2587 398/79 |

(Continued)

FOREIGN PATENT DOCUMENTS

CN  103941515 B  * 11/2016

*Primary Examiner* — Pranesh K Barua
(74) *Attorney, Agent, or Firm* — Josh C. Snider

(57) ABSTRACT

An optical communication network includes a primary laser source, a first comb generator, and a first transceiver. The first comb generate a first plurality of comb tones having constant frequency spacing. The first transceiver includes a first transmitter having a secondary laser with a resonator frequency injection locked to a frequency of a single longitudinal mode corresponding to a particular comb tone of the first plurality of comb tones. The first transmitter adheres input data onto the injection locked frequency, and outputs a modulated data stream over an optical transport to a second transceiver downstream of the first transceiver. The improvement includes a second comb generator disposed downstream of, receives a seed tone from, and is phase-synchronized with, the first comb generator. The second comb generator outputs a second plurality of comb tones substantially conforming to the frequencies and frequency spacing of the first plurality of comb tones.

19 Claims, 31 Drawing Sheets

(56) References Cited

U.S. PATENT DOCUMENTS

| | | | |
|---|---|---|---|
| 2017/0033870 A1* | 2/2017 | Dangui | H04B 10/40 |
| 2018/0337734 A1* | 11/2018 | Gao | H04B 10/27 |
| 2019/0245623 A1* | 8/2019 | Campos | H04J 14/04 |
| 2019/0268074 A1* | 8/2019 | Jia | H04B 10/532 |

* cited by examiner

SYSTEMS AND METHODS FOR FULL FIELD TRANSCEPTION

FIELD

The field of the disclosure relates generally to optical communication networks, and more particularly, to optical networks utilizing optical injection locking techniques.

BACKGROUND

Conventional telecommunication networks include an access network through which end user subscribers connect to a service provider. Bandwidth requirements for delivering high-speed data and video services through the access network are rapidly increasing to meet growing consumer demands. At present, data delivery over the access network is growing by gigabits/second (Gb/s) for residential subscribers, and by multi-Gb/s for business subscribers. Conventional access networks are typically based on passive optical network (PON) access technologies, which have become the dominant system architecture to meet the growing high capacity demand from end users.

Conventional gigabit PON (GPON) and Ethernet PON (EPON) architectures are known to provide about 2.5 Gb/s data rates for downstream transmission and 1.25 Gb/s for upstream transmission (i.e., half the downstream rate), and high-bandwidth PON applications utilize time and wavelength division multiplexing (TWDM and WDM). Some WDM technologies send a dedicated wavelength signal to end users, but intensity-modulated direct detection (IMDD) PON systems are known to be limited by low receiver sensitivity, and by few options available to upgrade and scale the IMDD PON. Conventional PON access networks typically include six fibers per node, servicing as many as 500 end users, such as home subscribers.

The present inventors have introduced an innovative coherent PON (CPON) solution that significantly increases the receiver sensitivity and overall capacity for WDM-PON access networks, as described in U.S. Pat. No. 9,912,409, the disclosure of which is incorporated by reference herein. This previous coherent solution provides superior receiver sensitivity, an extended power budget, and high frequency selectivity of coherent technology, but with an innovative system that optically injection locks (OIL) all inexpensive, lower-performance lasers in the system (e.g., Fabry-Perot laser diodes (FPLDs)) to a single high-performance source laser (e.g., an external cavity laser (ECL)). An embodiment of this previous innovative solution is described below with respect to FIG. 1.

FIG. 1 is a schematic illustration of a conventional coherent optical communication system 100. System 100 includes an optical hub 102, a node 104, and one or more end user transceivers 106 in a PON architecture utilizing coherent Dense Wavelength Division Multiplexing (DWDM). Optical hub 102 communicates with fiber node 104 over a bi-direction optical medium having a downstream component 108 and an upstream component 110, and fiber node 104 connects with end users 106 by fiber optics 112. Optical hub 102 includes an optical frequency comb generator 114, which is configured to receive a high quality source signal 116 from an external parent source laser 118 and generate multiple coherent tones 120(1), 120(1'), ... 120(N), 120(N'), which in turn are fed into an amplifier 122, which feeds into a first hub optical demultiplexer 124 for outputting a plurality of unmodulated phase synchronized coherent tone pairs 126 (i.e., N pairs 126(1), 126(2), ... 126(N)).

In operation, a first tone 128 of each phase synchronized coherent tone pair 126 is fed to each of a first coherent transmitter 130 and a first coherent receiver 132 of a hub transceiver 134, and a second tone 136 of the same phase synchronized coherent tone pair 126 is sent downstream to both of a coherent end receiver 136 and a coherent end transmitter 140 of end user transceiver 106. At first coherent transmitter 130, first tone 128 is passed through an optical circulator 142, and then into a first child laser 144 of a first modulator 146, which modulates the unmodulated first tone 128 with data to output a first modulated data stream 148 sent downstream for coherent detection by end receiver 138. In a similar manner, at end transmitter 140, second tone 136 is passed through an optical circulator 150, and then into an end child laser (not separately shown) of and end modulator 152, which modulates the unmodulated second tone 136 with data to output an upstream modulated data stream 154 sent upstream for coherent detection by first receiver 132.

With source signal 116 of a high quality, narrow band, and substantially within a single longitudinal mode, both of the unmodulated first tone 128 and second tone of a particular coherent tone pair 126 are transmitted as high quality, narrowband signals, such that first tone 128 serves as the downstream seed and the upstream local oscillator (LO) throughout system 100, and second tone 136 serves as the reverse, namely, the upstream seed and the downstream LO. According to system 100, because the two signals entering each receiver (i.e., unmodulated second tone 136 and first modulated data stream 148 at end receiver 138, unmodulated first tone 128 and upstream modulated data stream 154 at first coherent receiver 132), both signals are phase-synchronized, thereby greatly simplifying the need for digital signal processing (DSP) by either receiver. According to this technique, all transmitter lasers within system 100 may easily injection lock to source signal 116 as a respective child laser to parent laser 118.

Accordingly, the hardware cost of system 100 is greatly reduced by avoiding the need for expensive, higher-quality lasers at each transmitter, but still realize a comparable signal quality for both upstream and downstream transmissions. This cost reduction improves more significantly as the number of end user transceivers 106 from a single hub 102 increases, such as in the case where multiple upstream channels from different end users 106 are multiplexed at fiber node 104 and sent to optical hub 102.

Nevertheless, the growing number of global internet users, presently estimated to be over four billion, is driving an ever-increasing demand for bandwidth from existing data center interconnects (DCI) and optical access networks. To meet these high capacity demands, the coherent optics solution described above has proven useful in emerging DCI and access network applications due to its superior performance in terms of sensitivity and spectral efficiency. However, cost is still a major hurdle for large scale deployments in short-haul networks. There is a desire in the industry to increase the achievable bandwidth without significantly increasing the associated hardware costs.

For example, conventional coherent technology deployments in long-haul optical systems utilize discrete photonic and electronic components considered to be best-in-class. The short-haul optical network paradigm, on the other hand, is a different environment than the long-haul (or metro) optical network paradigm. Conventional optical network costs are primarily driven by the need for separate transmitter lasers and LOs. System 100 significantly reduces such costs by eliminating the need for a separate LO optical source. System 100 further reduces the transmitter laser cost by utilizing lasers low-cost transmitter lasers (e.g., FPLDs), i.e., having acceptable degradation in system performance, instead of the much more costly ECLs for each transmitter. FPLDs are further preferred over ECLs in the short-haul environment due to a less demanding optical link power budget in the short-haul optical network paradigm.

In network locations such as central offices or hubs, the implementation of optical frequency comb 114 and system 100 has proven to be an attractive solution for replacing many independently-operated ECLs in WDM systems, and then subjecting all child lasers, both at the network location and downstream, to external optical signal injection for OIL, i.e., the phenomenon where the child laser phase- and frequency-locked to the external optical signal. By implementing coherent OIL (COIL) with an optical comb, system 100 provides effective optical filtering and amplification, which relaxes the comb source requirements, while also improving optical signal-to-noise ratio (OSNR).

However, according to system 100, although optical frequency comb generator 114 produces a plurality of simultaneous narrow width wavelength channels with controlled spacing (e.g., channel spacing of 25 GHz, 12.5 GHz, 6.25 GHz, etc., based on available signal bandwidth occupancy), two separate tones 128, 136 are required for each downstream/upstream channel transmission. Accordingly, it is further desirable to be able to repurpose some of this limited bandwidth for different channels.

SUMMARY

In an embodiment, an optical communication network includes (i) a primary laser source, (ii) a first comb generator configured to generate a first plurality of comb tones having a constant frequency spacing with respect to one another, and (iii) a first transceiver including a first transmitter having a first secondary laser with a resonator frequency being injection locked to a frequency of a single longitudinal mode corresponding to a particular comb tone of the first plurality of comb tones. The first transmitter is configured to adhere an input data stream onto the injection locked frequency and output a laser modulated data stream over an optical transport medium to a second transceiver downstream of the first transceiver with respect to the optical transport medium. The improvement includes a second comb generator disposed downstream of the first comb generator with respect to the optical transport medium. The second comb generator is (i) configured to receive a seed tone from the first comb generator, (ii) is phase-synchronized with the first comb generator, and (iii) further configured to output a second plurality of comb tones substantially conforming to the respective frequencies and constant frequency spacing of the first plurality of comb tones.

In an embodiment, an optical communication network includes, a primary laser source, a first comb generator, a second comb generator, a first transceiver, and a second transceiver. The first comb generator is disposed at a first end of an optical communication medium, and configured to (i) receive the primary laser source as an input signal, and (ii) output a generated first plurality of comb tones having a constant frequency spacing. The second comb generator is disposed at a second end of the optical communication medium opposite the first end, and configured to (i) receive, as an input, a seed tone from the generated first plurality of comb tones, (ii) output a generated second plurality of comb tones at the constant frequency spacing, and (iii) phase-synchronize with the first comb generator. The first transceiver is proximate the first comb generator at the first end of the optical communication medium, and includes a first secondary laser injection locked to a frequency of a single longitudinal mode of a first comb tone of the first plurality of comb tones. The second transceiver is proximate the second comb generator at the second end of the optical communication medium. The second transceiver includes a second secondary laser injection locked to the frequency of the single longitudinal mode of the first comb tone.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
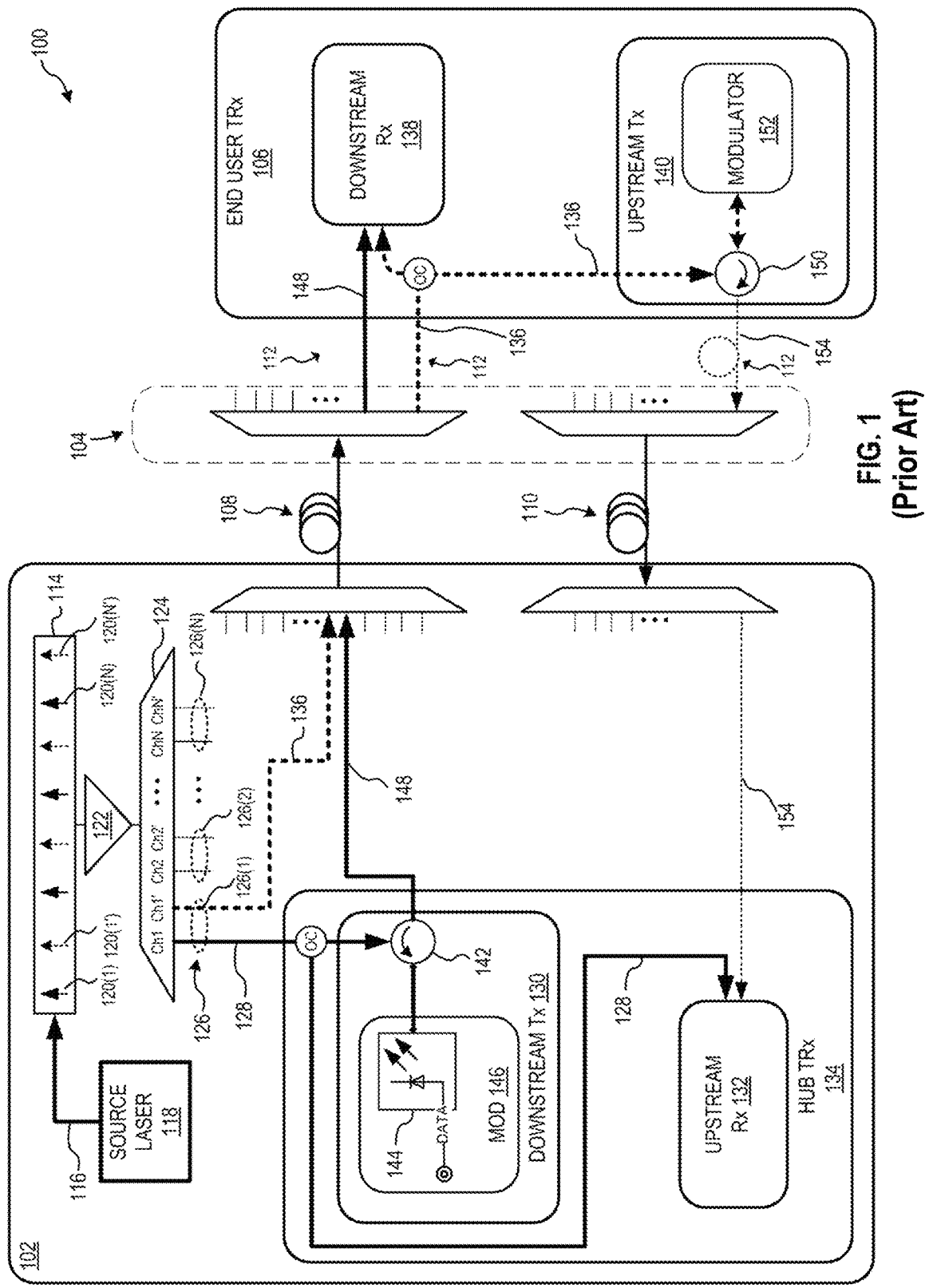
FIG. 1 is a schematic illustration of a conventional coherent optical communication system.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As used herein, the term "coherent transceiver," unless specified otherwise, refers to a P2P or P2MP coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and a "distance" between nodes may be physical or perceptual. A hyperscale datacenter may include several performance optimized datacenters (PODs), and each POD may include multiple racks and hundreds and thousands of compute and/or storage devices."

The systems and methods described herein expand upon the OIL/COIL innovations previously developed by the present inventors. In an exemplary embodiment, a dual-comb architecture is provided, which effectively doubles the available bandwidth for upstream and downstream transmissions over the same fiber infrastructure, and without a significant increase to overall hardware cost of the system.

Additionally, in many optical access network implementations, a single-fiber topology is deployed, i.e., both downstream and upstream transmission occur over the same single strand of fiber, or in the case of free-space optical (FSO) transmission, both directional transmissions utilize the FSO communication medium. The present embodiments are therefore particularly useful for such bidirectional applications, and for full-duplex (FDX) simultaneous bidirectional coherent transmission schemes, in that the present systems and methods further advantageously operate agnostically of direction of transmission.

In this regard, the terms "downstream" and "upstream" are relative, and merely indicate one transceiver as a reference point to a different transceiver at the other end of the optical communication medium. For ease of explanation, the following description refers to communications transmitted from the transceiver side proximate the primary laser source as "downstream" transmissions, and communications transmitted to this primary transceiver side over the optical communication medium as "upstream" transmissions. The person of ordinary skill in the art will comprehend that this relative terminology is provided by way of illustration, and is not intended to be limiting.

Also for ease of explanation, the following examples are described with respect to test results using various single-fiber lengths. As described above, other communication media may be employed without departing from the dual-comb scope herein. The illustrative examples described below are provided to demonstrate the particular advantages realized according to the present systems and methods with regard to existing PON architectures, as well as future coherent optical networks, utilizing single-fiber topologies. This efficient use of fiber resources significantly facilitates and improves enterprise connectivity and optical link redundancy.

Figure 2A:
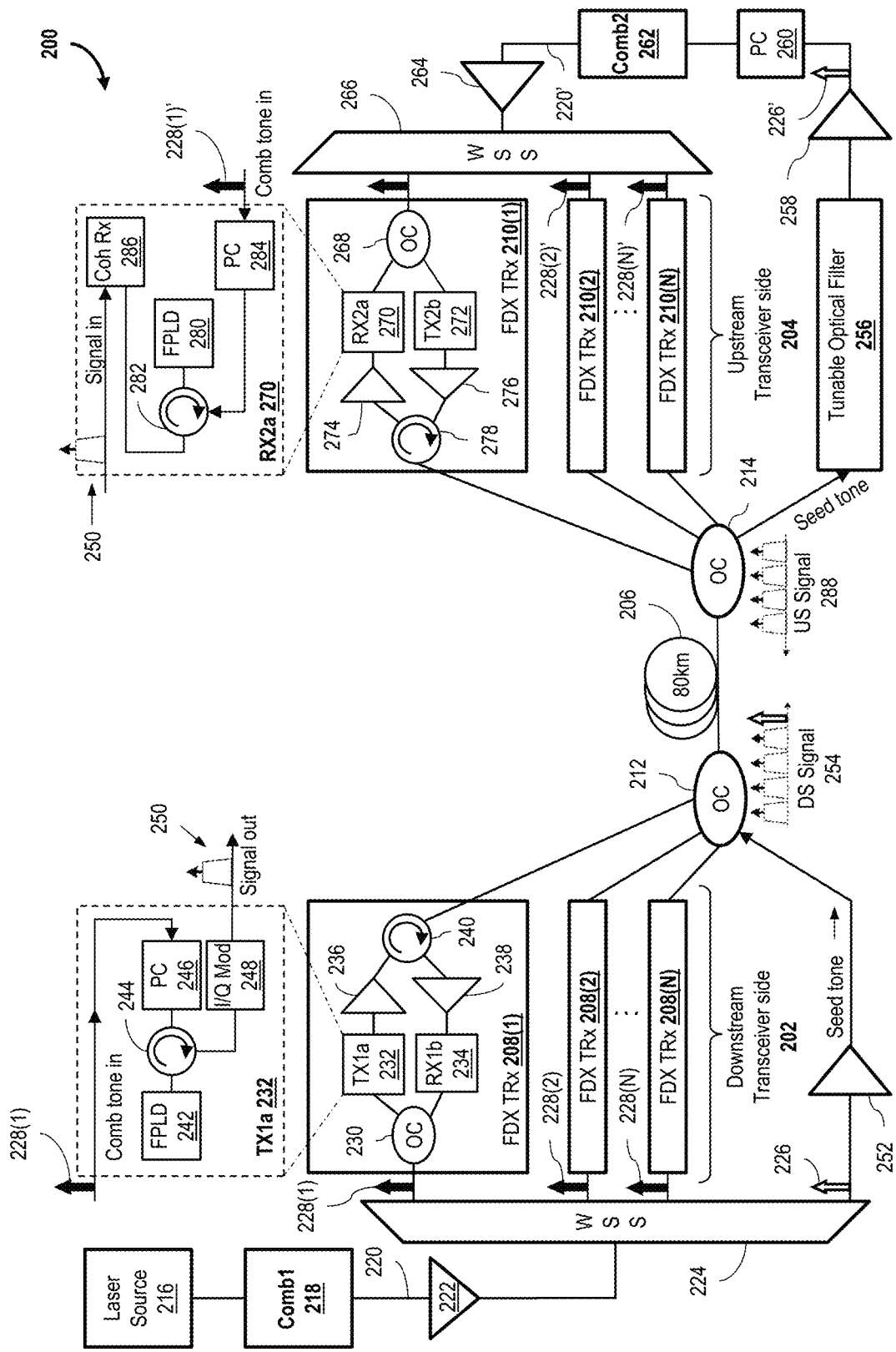
FIG. 2A is a schematic illustration of an exemplary coherent optical communication system, in accordance with an exemplary embodiment of the present disclosure.

FIG. 2A is a schematic illustration of an exemplary coherent optical communication system 200, in accordance with an exemplary embodiment of the present disclosure. In the exemplary embodiment depicted in FIG. 2A, system 100 is similar, in many aspects, to system 100, FIG. 1, and elements of system 200 having similar structure and functionality are labeled the same.

For example, in an exemplary embodiment, system 200 includes a downstream transceiver side 202 in operable communication with an upstream transceiver side 204 over an optical communication medium 206. In the embodiment depicted in FIG. 2A, optical communication medium is illustrated, by way of example, and not in a limiting sense, as an 80 km single optical fiber/single mode fiber (SMF). Downstream transceiver side 202 includes a plurality of first transceivers 208 (i.e., 1-N first transceivers 208(1)-208(N)), and upstream transceiver side 204 similarly includes a plurality of second transceivers 210 (i.e., 1-N second transceivers 210(1)-210(N)). In this example each of first transceivers 208 connect with optical fiber 206 through a first optical coupler 212, and each of second transceivers 210 connect with optical fiber 206 through a second optical coupler 214. In alternative embodiments, transceivers 208, 210 may additionally, or alternatively, utilize splitters/combiners, FSO transmitters/detectors, and/or multiplexers/de-multiplexers.

In this example, downstream transceiver side 202 may thus be representative of transceiver deployment at an optical hub or headend, a central office, a communications hub, or an OLT utilizing an MTS for one or more of first transceivers 208. Similarly, upstream transceiver side 204 may be representative of transceiver deployment for multiple end-users employing a downstream termination unit, such as modem or ONU, for one or more of second transceivers 210. In the embodiment shown, system 200 depicts an exemplary PON architecture for a bidirectional FDX CPON implementing coherent DWDM.

In an exemplary embodiment, at downstream transceiver side 202, system 200 further includes a primary laser source 216 configured to output a high-quality parent source laser signal to a first optical frequency comb generator 218. An exemplary configuration for first comb generator 218 is described further below with respect to FIG. 2B. In other embodiments, first optical frequency comb generator 218 may utilize, for example, a mode-locked laser, a gain-switched laser, and/or electro-optic modulation, such that multiple first coherent tones 220 are generated as simultaneous low-linewidth wavelength channels of known and controllable spacing, as described further below with respect to FIG. 2C.

Generated first coherent tones 220 are fed into an amplifier 222 (e.g., an erbium-doped fiber amplifier (EDFA)), and the amplified signal therefrom is input into a downstream optical demultiplexer 224 (e.g., a wavelength selective switch (WSS)). Downstream optical demultiplexer 224 outputs first coherent tones 220 as a seed tone 226, and a plurality of spaced comb tones 228, where each spaced comb tone 228 is input to a respective first transceiver 208.

In an exemplary embodiment, each first transceiver 208 may be configured for bidirectional FDX transmission, and includes an optical coupler 230, a coherent transmitter 232, a coherent receiver 234, a first amplifier 236, a second amplifier 238, and a first optical circulator 214. Optical coupler 230 is configured to receive the respective input comb tone 228 at a relatively narrow spectral linewidth inherited from parent laser source 216 (e.g., an ECL), and relay that comb tone 228 to each of coherent transmitter 232 and coherent receiver 234, where comb tone 228 may then serve as (i) a master seed light to drive an OIL/COIL setup in coherent transmitter 232 for a downlink (DL) signal transmission (e.g., by way of first amplifier 236 and first optical circulator 240), and (ii) to generate the LO by way of a different OIL/COIL setup for uplink (UL) signal detection (e.g., by way of first optical circulator 240, and then through second amplifier 238). For simplicity of explanation, the configuration of only one first transceiver 208 (i.e., first transceiver 208(1)) is illustrated in FIG. 2A.

In the exemplary embodiment depicted in FIG. 2A, coherent transmitter 232 includes a first secondary laser 242 (e.g., an FPLD), a second optical circulator 244 (e.g., a three-port optical circulator), a polarization combiner (PC) 246, and an I/Q modulator 248. In operation, the respective comb tone 228 is received at PC 246, which functions to control the polarization of the seed light of comb tone 228, which is then sent to second optical circulator 244, which then injects the seed light into a cavity (not separately shown) of first child laser 242 to injection lock first secondary laser 242 as a child laser to the parent laser signal from primary laser source 216. Data may then be modulated, by I/Q modulator 248, onto the injection locked signal to generate a downstream modulated output signal 250.

In further operation of system 200, seed tone 226 is amplified by a first seed amplifier 252, and then combined, at first optical coupler 212, with the respective modulated output signals 250 of first transceivers 208 (e.g., output signals 250(1)-250(N)) to produce downstream signal 254. At second optical coupler 214, amplified seed tone 226 may be received by a tunable optical filter 256, and then further amplified by a second seed amplifier 258 prior to input into a PC 260, followed by a second comb generator 262, which is configured to generate a plurality of second comb tones 220' corresponding to first comb tones 220.

More particularly, by using seed tone 226 (amplified and seed tone 226') as its input, second comb generator 262 obtains all carriers from first comb generator 218, and in complete synchronization (i.e., phase coherency) with first comb generator 218. That is, second comb generator 262 is phase-synchronized with first comb generator 218. Different though, from system 100, FIG. 1, the single seed tone 226 may be utilized to generate all LOs for second transceivers 210, instead of generating a separate individual phase synchronized coherent tone for each point-to-point (P2P) pairing of respective first and second transceiver 208, 210.

Accordingly, in further operation of system 200, each second transceiver 210 may be configured similarly to first transceiver 208, and thus may also be configured for bidirectional FDX transmission and include an optical coupler 268, a coherent receiver 270, a coherent transmitter 272, a first amplifier 274, a second amplifier 276, and a first optical circulator 278. In an exemplary embodiment, coherent receiver 270 includes a second secondary laser 280 (e.g., an FPLD), a second optical circulator 282 (e.g., a three-port optical circulator), a PC 284, and coherent receiving unit 286 (e.g., an ICR, ADC, and/or DSP). In operation, the respective amplified comb tone 228' is received at PC 284, the seed light thereof then sent to second optical circulator 282 for injection into a cavity of second secondary laser 242 for injection locking to the parent laser signal from primary laser source 216. At the same time, downstream modulated output signal 250 is received at coherent receiving unit 286 for coherent detection thereof.

In this embodiment, the relevant structure and function of coherent transmitter 272 may be similar to that of coherent transmitter 232, except that each coherent transmitter 272 will output a different respective modulated output for aggregation, at second optical coupler 214, into a combined upstream signal 288. In a similar manner, except for the difference in modulated input signals to the respective coherent receiving unit 286, the structure and function of coherent receiver 234 may also be substantially similar to that of coherent receiver 270.

According to the innovative configuration of system 200, with only a modest hardware cost increase of second comb generator 262 and tunable optical filter 256, the present systems and methods are advantageously enabled to realize nearly twice the available bandwidth of previous system 100, yet without sacrificing any of the additional benefits achieved according to this prior system 100. Additionally, the person of ordinary skill in the art will understand that the single-secondary laser configuration described above for the respective transmitters 232, 272 and receivers 234, 270 is provided by way of example, and is not intended to be limiting. Other secondary laser configurations (e.g., 2-FPLDs, 4-FPLDs, etc.) may be implemented for any and all of the multiple transceivers of system 200 without departing from the scope herein.

The architecture described herein, by avoiding the need for conventional compensation hardware, can therefore be structured as a significantly less expensive and more compact physical device than conventional devices. This novel and advantageous system and subsystem arrangement allows for multi-wavelength emission with simplicity, reliability, and low cost. Implementation of first optical frequency comb generator 218, with high quality input source signal from parent laser 216, further allows simultaneous control of multiple sources that are not realized by conventional discrete lasers. According to the embodiments herein, channel spacing, for example, may be 25 GHz, 12.5 GHz, or 6.25 GHz, based on available signal bandwidth occupancy. These advantages thus become even more pronounced with regard to the dual-comb configuration of first optical frequency comb generator 218 with its matching (i.e., phase synchronized) second optical frequency comb generator 262.

The utilization of the present dual-comb generator architecture enables maintenance of a constant wavelength spacing, thereby avoiding optical beat interference (OBI) that would otherwise be prevalent in conventional simultaneous transmissions over a single fiber. In the exemplary embodiment illustrated in FIG. 2, system 200 may further include a fiber node at upstream transceiver side 204, and either as a passive system, adapted to a remote PHY solution, or adapted to a remote modem termination system (MTS) included in the fiber node.

As illustrated and described herein, system 200 may utilize a coherent DWDM-PON architecture to incorporate the novel solutions described herein that meet the unique requirements of the access environment, using cost-efficient structures not seen in conventional hardware systems. Whereas implementation of a single optical frequency comb generator enables a simplified tuning of the entire wavelength comb by producing a plurality of simultaneous narrow width wavelength channels with controlled spacing, implementation of the dual-comb configuration described herein provides still further advantages over the single-comb solutions.

For example, according to the present systems and methods, by generating a matching comb on the side of the opposing transceivers, the present embodiments realize a significantly more efficient use of the available spectrum (i.e., nearly double), while further avoiding the need for hyperdyne schemes, but also realizing significant cost savings and reduction in hardware complexity in comparison with the intradyne detection schemes used in long-haul systems. Whereas conventional techniques implement in-band extraction of the LO, systems and methods according to the present embodiments enable a significantly simplified out-of-band (OoB) extraction of the LO. That is, one seed tone may be used to generate all LOs used throughout the system.

Proof of Concept —Experimental Results

The exemplary embodiment described above with respect to FIG. 2A was tested in real-world conditions to provide proof of concept. In this test embodiment of system 200, and FDX P2P coherent optical link was created having the respective transmitters and LOs thereof injection locked to 25 GHz spacing for the respective optical frequency comb generators 218, 262. At the "hub" side of system 200 (e.g., downstream transceiver side 202), an ECL was used for laser source 216, which produced a 50 kHz linewidth ECL output signal (15 dBm, 1560.606 nm), which was then fed to first comb generator 218. The architectural configuration used for the test version of first comb generator 218 is described further below with respect to FIG. 2B.

Figure 2B:
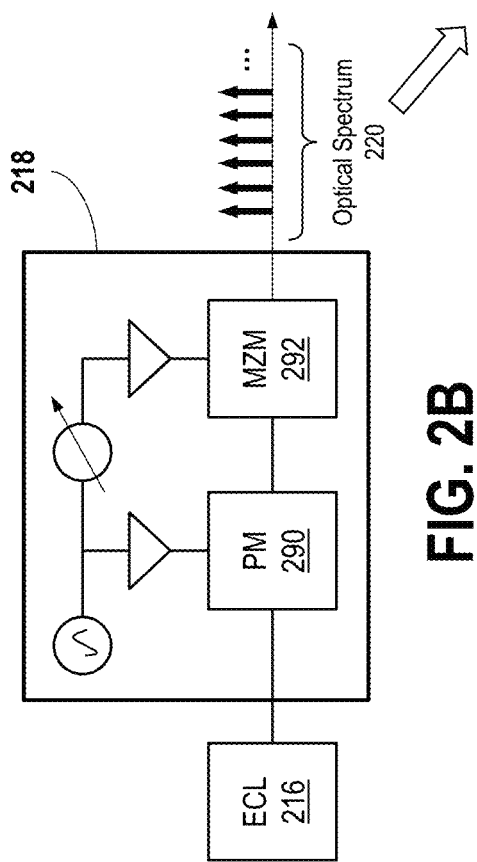
FIG. 2B is a schematic illustration of the first optical frequency comb generator depicted FIG. 2A.
Figure 2C:
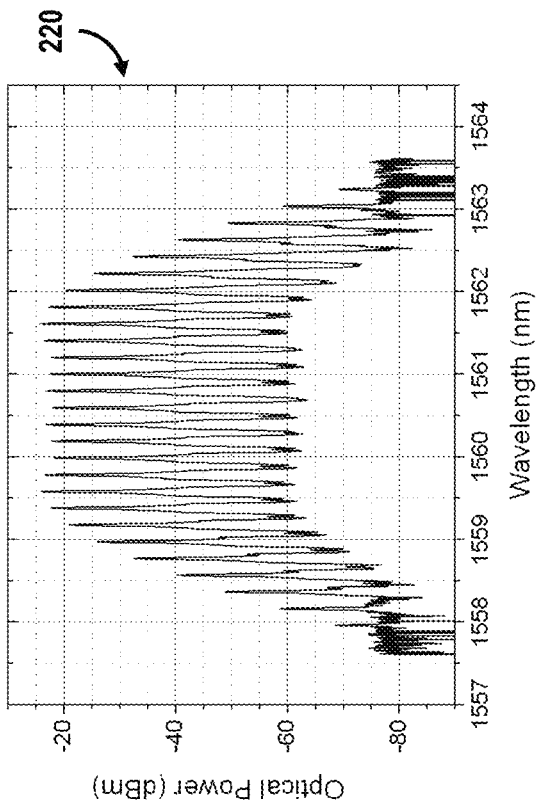
FIG. 2C is a graphical illustration depicting an optical spectrum of the generated comb tones depicted in FIG. 2A.

FIG. 2B is a schematic illustration of first optical frequency comb generator 218, FIG. 2A. In the embodiment experimentally tested, a phase modulator (PM) 290 of first comb generator 218 received the 50 kHz linewidth ECL output signal from laser source 216, which in turn output a phase-modulated signal to a Mach-Zehnder modulator (MZM) 292. Both of PM 290 and MZM 292 were driven with a 25 GHz RF signal to generate optical frequency comb tones 220. FIG. 2C is a graphical illustration depicting an optical spectrum of generated comb tones 220, FIG. 2A.

Figure 2D:
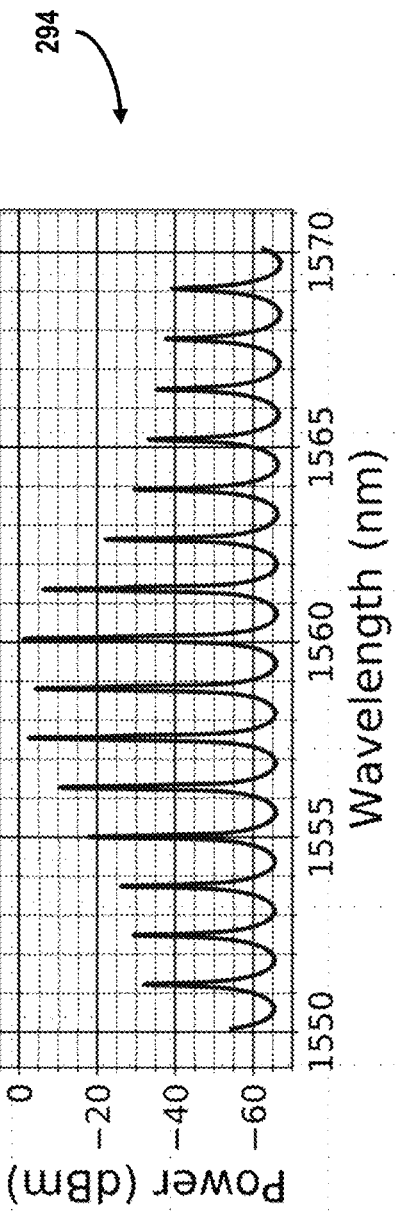
FIG. 2D is a graphical illustration depicting a pre-locking optical spectrum plot of the first secondary laser depicted in FIG. 2A.
Figure 2E:
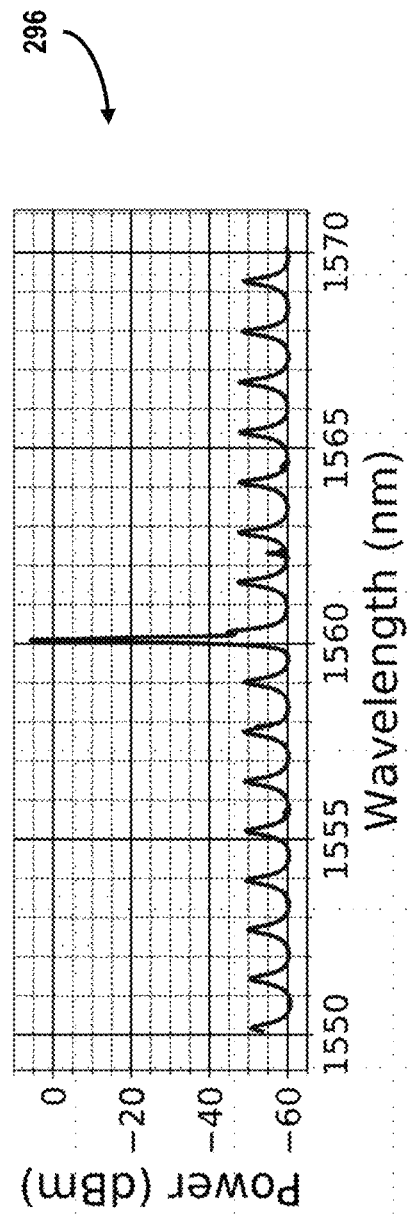
FIG. 2E is a graphical illustration depicting a post-locking optical spectrum plot of the first secondary laser depicted in FIG. 2A.

FIG. 2D is a graphical illustration depicting a pre-locking optical spectrum plot 294 of first secondary laser 242, FIG. 2A. FIG. 2E is a graphical illustration depicting a post-locking optical spectrum plot 296 of first secondary laser 242, FIG. 2A. From a comparison of pre-locking plot 294 with post-locking plot 296, it may be seen how the OIL/COIL process enables secondary lasers 242 to be injection locked by the external primary laser source 216, which functions as a single frequency or longitudinal mode parent/seed laser to keep the frequency of a resonator mode of secondary laser 242 close enough to the frequency of primary laser source 216 to allow for frequency locking. This principle is also referred to as "laser cloning," where a single high quality master laser (i.e., primary laser source 216) transmits a narrow-bandwidth, low-noise signal for use by the relatively inexpensive secondary lasers 242, 280 throughout system 200 for the transmission of data-modulated signals 250, 288, respectively.

Figure 2F:
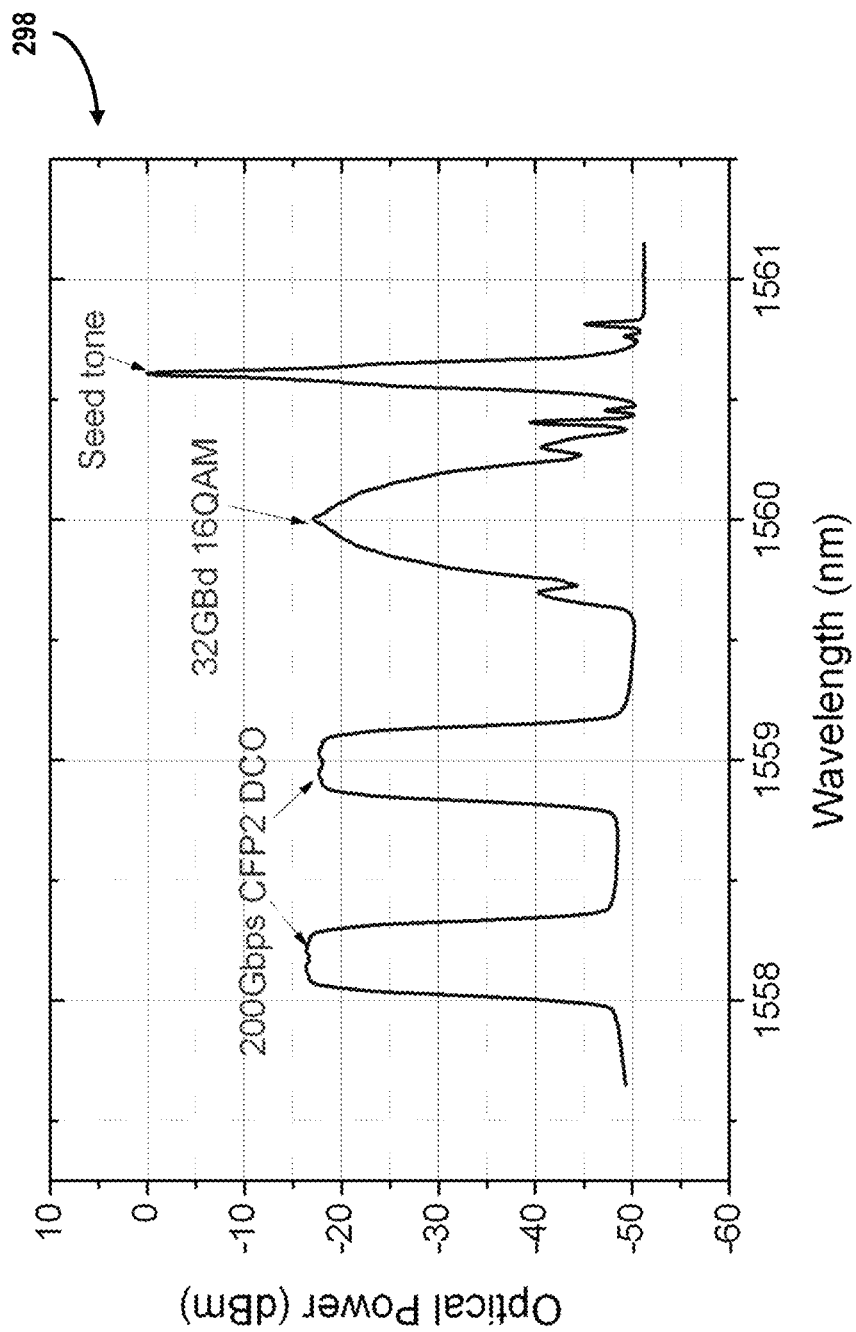
FIG. 2F is a graphical illustration depicting a downlink optical spectrum plot of the system depicted in FIG. 2A.

FIG. 2F is a graphical illustration depicting a downlink optical spectrum plot 298 of system 200, FIG. 2A. More particularly, plot 298 represents the measured optical spectrum of downstream signal 254 in the test configuration, including seed tone 226, a 32-GBd 16 QAM downlink signal, and the respective output signals from two 200 Gb/s commercial CFP2-DCO modules, respectively.

In operation of the test configuration for system 200, the generated comb tones 224 first amplified by EDFA 222, and then separated into multiple tones 226, 228, with 25 GHz channel spacing, by way of WSS 224. Each respective tone 228 was then sent to a corresponding FDX transceiver 208, where each respective comb tone 228, having a narrow spectral linewidth inherited from ECL 216, was then then separately sent, by optical coupler 230, (i) to be utilized as a master seed light driving the OIL setup in transmitter 232 for DL signal transmission of output signal 250, and (ii) separately to receiver 234, to generate the LO for the other, UL OIL setup for signal detection of upstream output signals 288. This test configuration PCs 246, 284 were included in each DL and UL OIL setup, respectively, to control the polarization of the seed light used therefor. In both setups, the secondary lasers 242, 280 were FPLDs, with the seed light injected into the cavity thereof by three-port optical circulators 244, 282, respectively.

To test the downlink, the output from FPLD 242 was fed into an external LiNbO3 dual-polarization (DP) 35 GHz/3-dB bandwidth in-phase and quadrature (I/Q) modulator, used as I/Q modulator 248, to generate the modulated downlink signals 250. For this testing scheme, the symbols were resampled to match the sampling rate of 80-GSa/s for the relevant DAC and oscilloscope, and the skews among the four channels therein were also pre-compensated before sending the data to the DAC. To achieve FDX transmission, optical circulator 240 was connected to both the output of transmitter 232 and to the input of receiver 234, and comb tone 228(1), which shared the same wavelength with the ECL pump light, was filtered and amplified to +10 dBm, and then combined with other signals 250(2)-250(N) from the other FDX first transceivers 208 by first optical coupler 212 before being transmitted downstream through a 80 km fiber link used for optical transport medium 206.

On the node/upstream transceiver side 204 of the optical link, after passing through second optical coupler 214 and tunable optical filter 256, the remotely delivered seed light from seed tone 226 was then amplified, by amplifier 258, to 15 dBm for input to second comb generator 262. Second comb generator 262, except for its input source, was substantially similar to first comb generator 218, FIG. 2B, and the generated comb tones 220' therefrom were further amplified through a semiconductor optical amplifier, used as amplifier 264, to ensure sufficient optical power (approximately -5 dBm) for stable OIL. These further amplified comb tones 220'or then delivered, through a second WSS as demultiplexer 266, to each FDX second transceiver 210 for UL signal generation and DL signal detection through the similar, other OIL setup described above. The experimental results of this real-world setup are described further below with respect to FIGS. 3-28.

Figure 3:
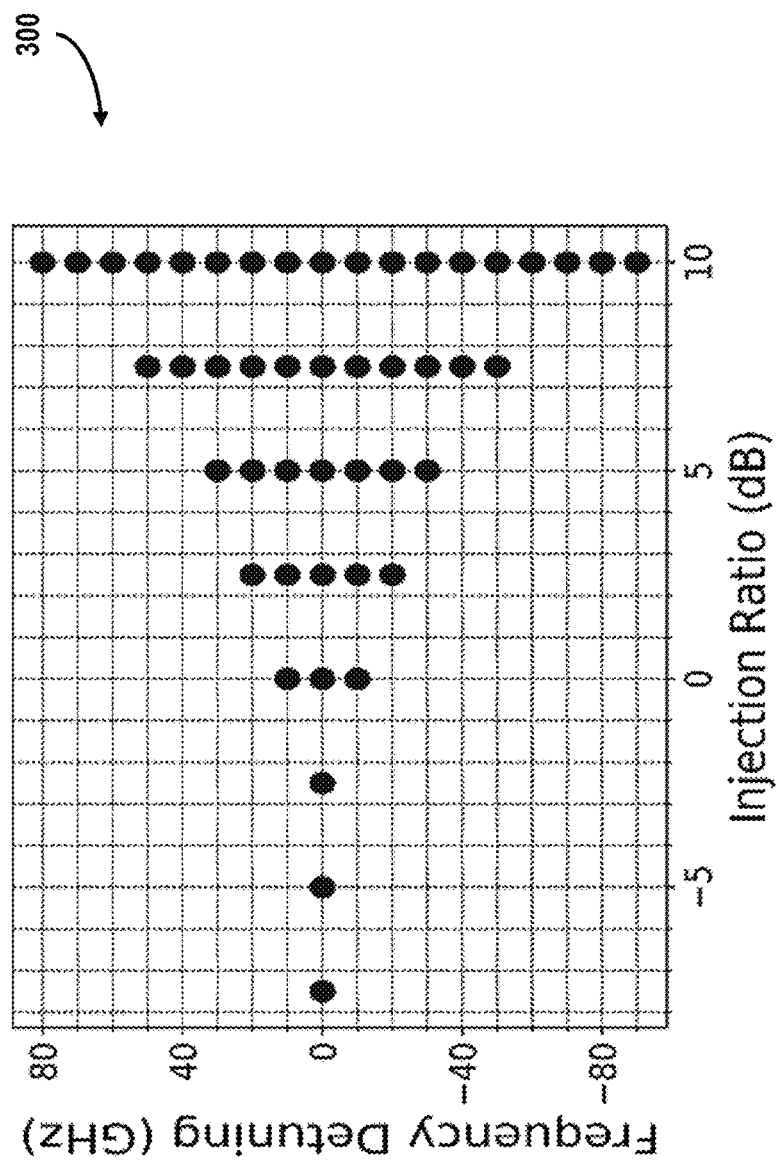
FIG. 3 is a graphical illustration depicting an optical injection locking map of injection ratio against frequency detuning.

FIG. 3 is a graphical illustration depicting an optical injection locking map 300 of injection ratio against frequency detuning. More specifically, map 300 illustrates a results-based analysis of ECL parent laser source 216 under multiple injection ratios, i.e., the power ratio between the parent ECL and the child FPLD, as well as various detuning frequencies. For the above testing scheme, the injection ratio was varied by adjusting the master ECL output power, while holding the power of the child relatively unchanged or stable within +5 dBm. The dotted results shown in map 300 thus indicate the occurrence of OIL/COIL under the corresponding injection ratio and frequency detuning shown. As can be seen from map 300, under higher injection ratios, the injection locking process becomes more forgiving to frequency detuning, thereby confirming the proof of concept and previous results in this regard.

Figure 4:
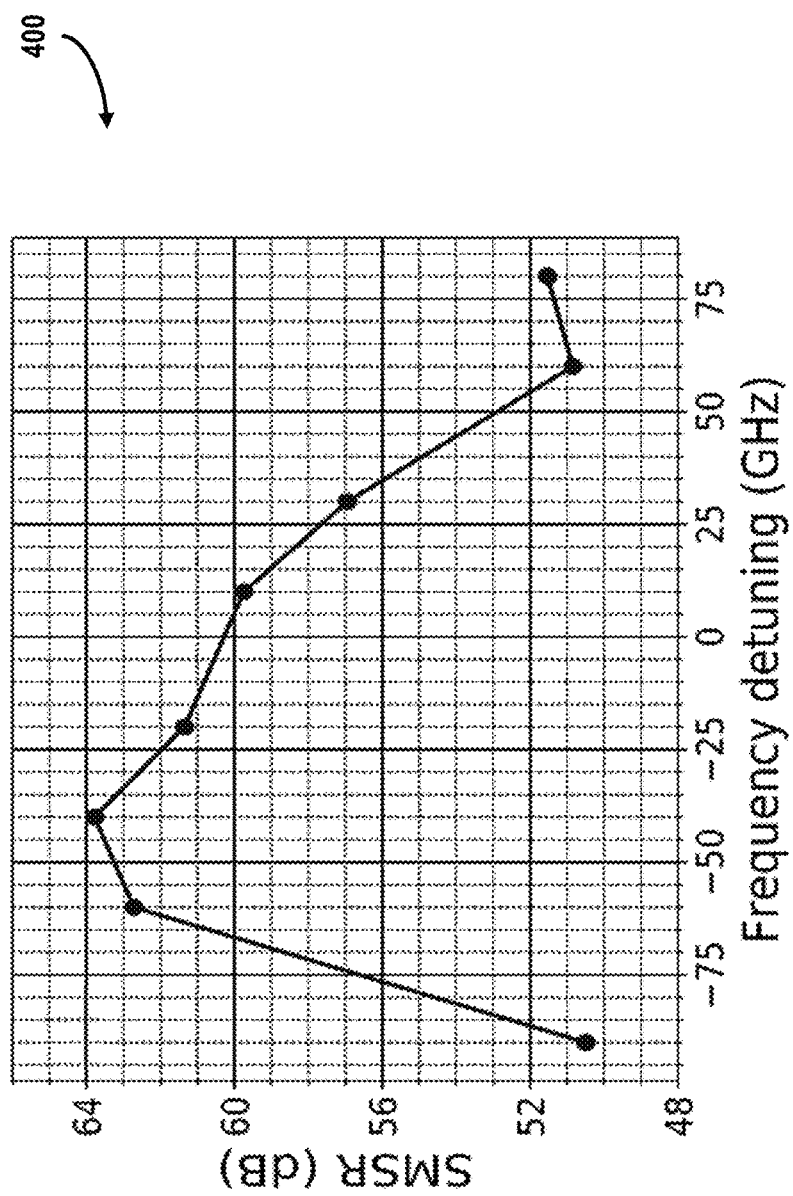
FIG. 4 is a graphical illustration depicting plot of side-mode suppression ratio against frequency detuning.

FIG. 4 is a graphical illustration depicting a plot 400 of SMSR against frequency detuning. More specifically, plot 400 illustrates a results-based analysis of ECL parent laser source 216 under various SMSR values and detuning frequencies. That is, at a 10 dB injection ratio, the SMSR of the analyzed injection-locked FPLD, under various detuning frequencies, was extracted to produce the results shown in plot 400. Accordingly, at positive frequency detuning values, the SMSR tends to decrease with as the detuning frequency increases, whereas, at negative frequency detuning values, the SMSR first improves as the detuning frequency increases, but then declines as the frequency increases toward positive values. This phenomenon is due to the linewidth enhancement factor of the parent ECL laser introducing carrier variation, which in turn induces a shift of the child FPLD laser gain towards longer wavelengths.

Figure 5:
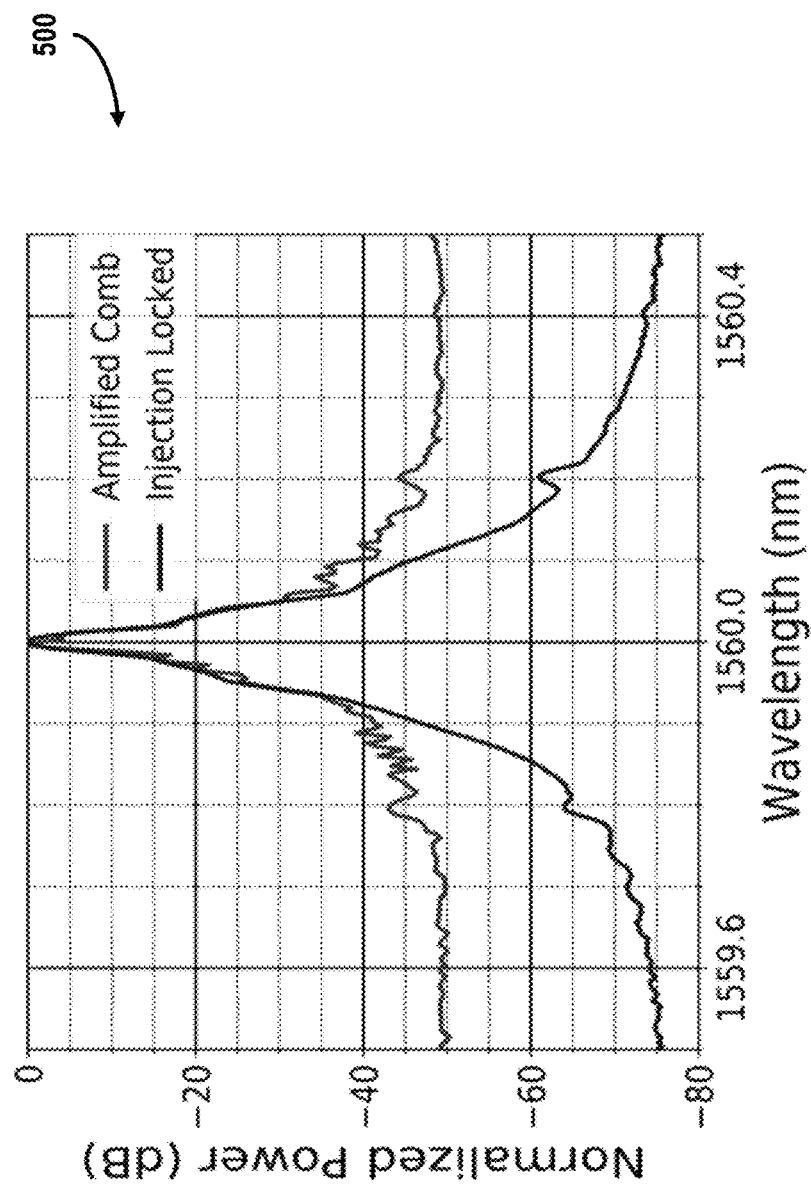
FIG. 5 is a graphical illustration depicting a comparative normalized optical spectrum plot of an injection-locked child laser against an amplified comb tone.

FIG. 5 is a graphical illustration depicting a comparative normalized optical spectrum plot 500 of an injection-locked child laser (upper subplot) against an amplified comb tone (lowers subplot). As can be seen from comparative plot 500, when injecting the same comb tone into the FPLD, the injection-locked offers better OSNR, and at a sufficient output power (+12 dBm, in this example), in comparison with a direct utilization of the comb tone, and without requiring additional amplification.

Figure 6:
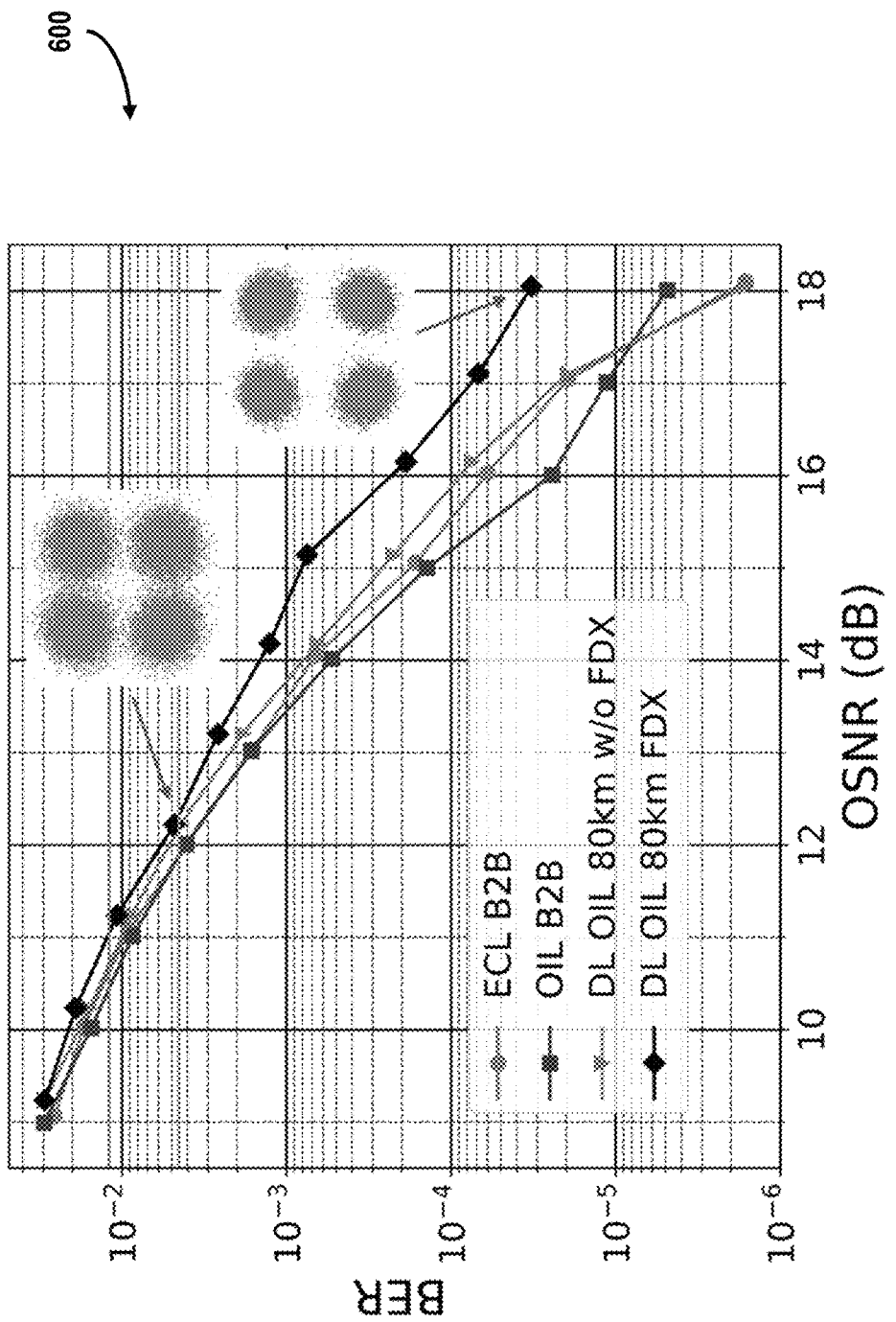
FIG. 6 is a graphical illustration depicting a comparative plot of downlink bit-error-rate performance against optical signal-to-noise ratio.

FIG. 6 is a graphical illustration depicting a comparative plot 600 of downlink bit-error-rate (BER) performance against OSNR. More specifically, plot 600 illustrates the downlink BER performance versus OSNR test results, with associated constellation diagrams, for the test FDX P2P optical system over an 80 km SMF link, for a 32-GBd DP-QPSK DL signal.

Figure 7:
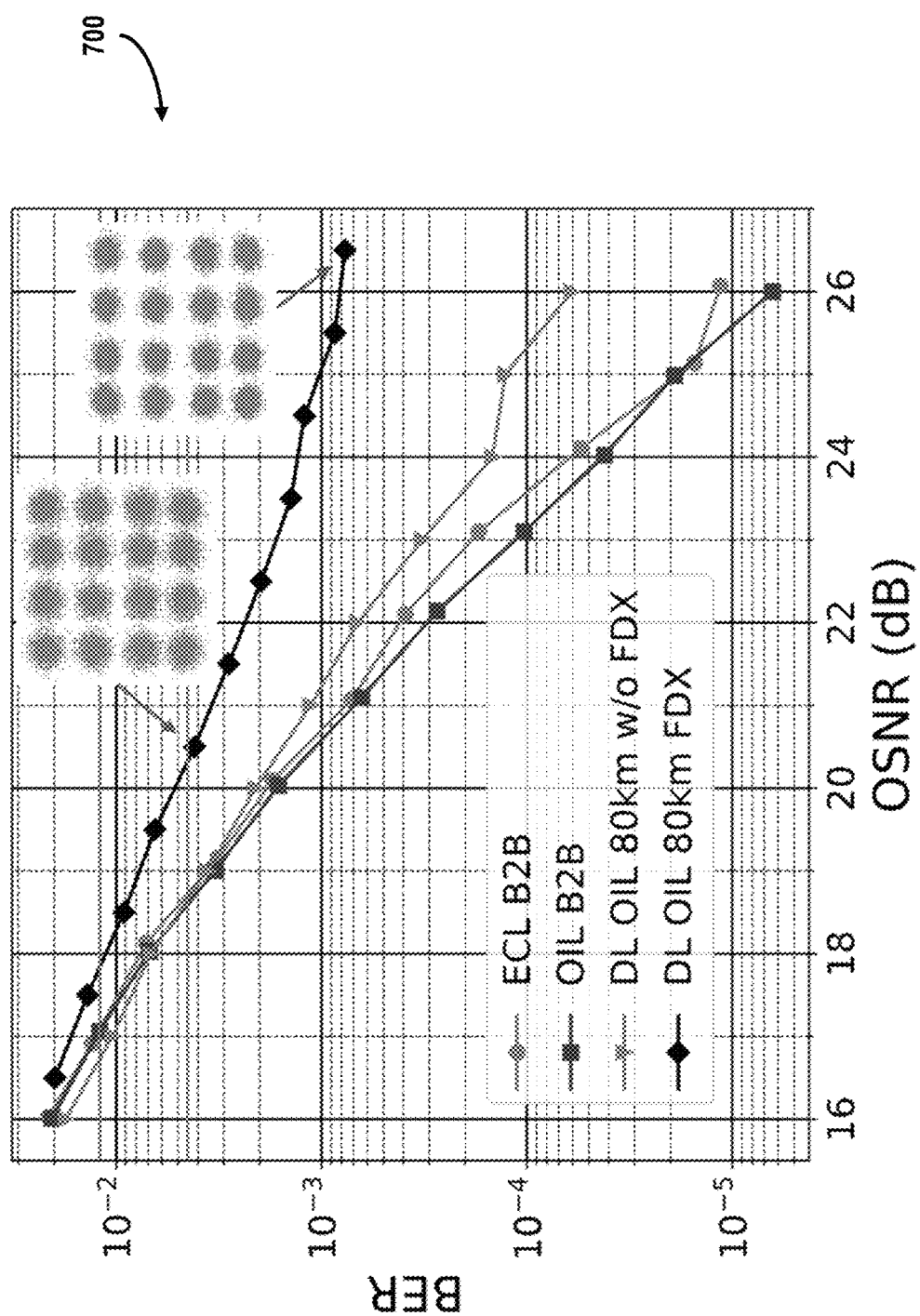
FIG. 7 is a graphical illustration depicting an alternative comparative plot of downlink bit-error-rate performance against optical signal-to-noise ratio.

FIG. 7 is a graphical illustration depicting an alternative comparative plot 700 of downlink BER performance against OSNR. Plot 700 indicates test results for a similar test setup as that used to produce plot 600, FIG. 6, except for a 32-GBd DP-16QAM DL signal.

Figure 8:
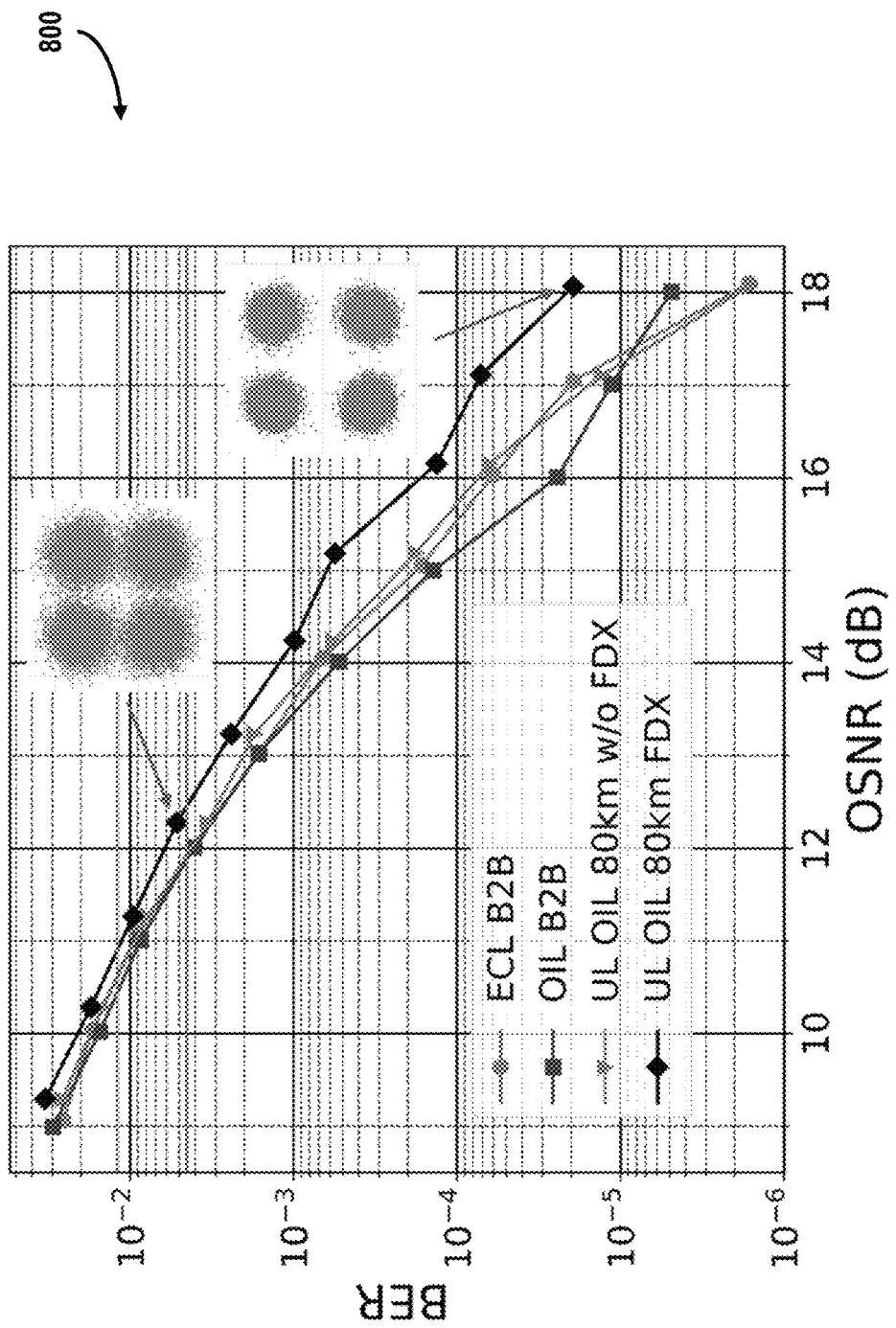
FIG. 8 is a graphical illustration depicting a comparative plot of uplink bit-error-rate performance against optical signal-to-noise ratio.

FIG. 8 is a graphical illustration depicting a comparative plot 800 of uplink BER performance against OSNR. Plot 800 indicates test results for a similar test setup as that used to produce plot 600, FIG. 6, except for the uplink counterpart thereof, i.e., a 32-GBd DP-QPSK UL signal.

Figure 9:
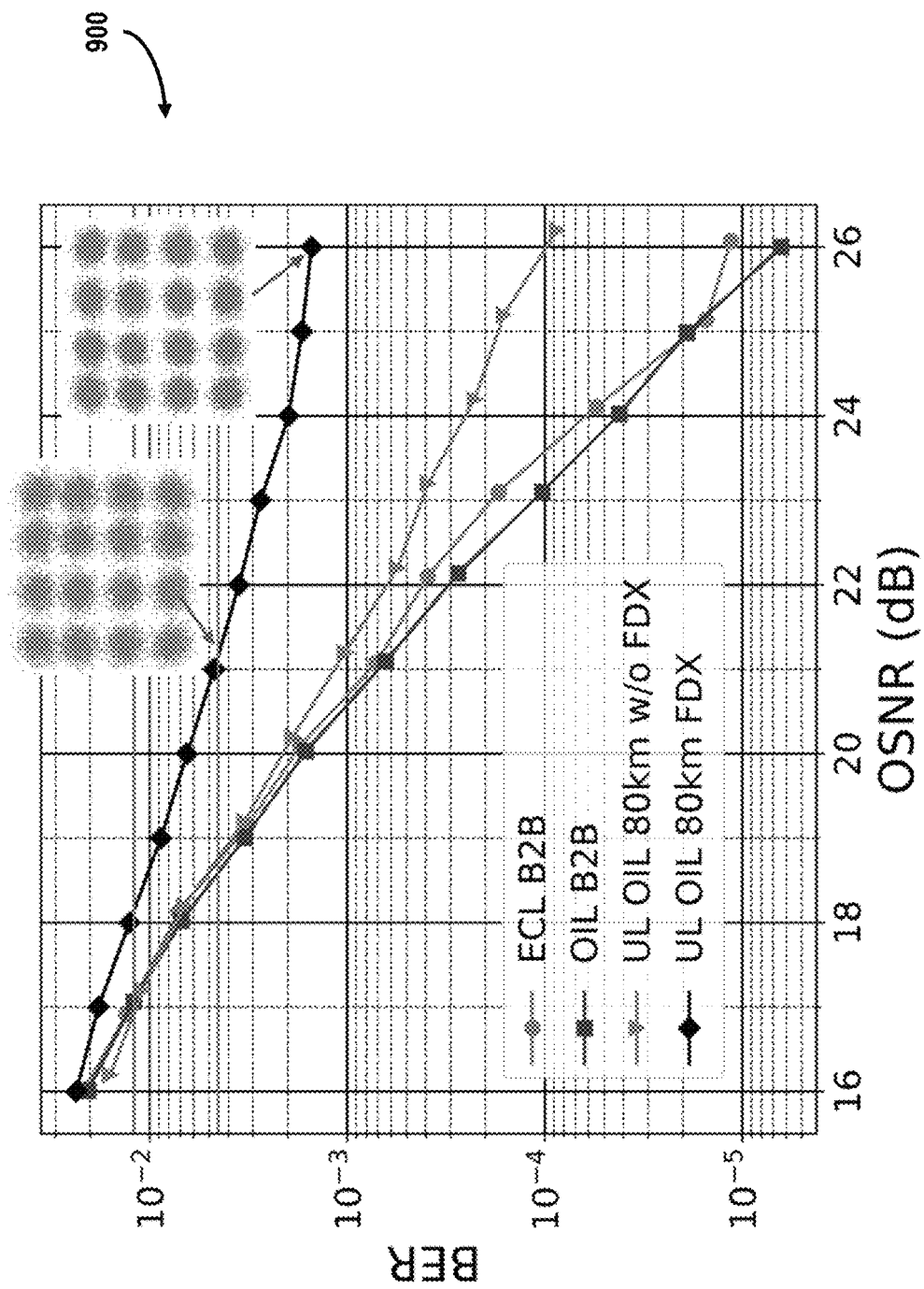
FIG. 9 is a graphical illustration depicting an alternative comparative plot of uplink bit-error-rate performance against optical signal-to-noise ratio.

FIG. 9 is a graphical illustration depicting an alternative comparative plot 900 of uplink BER performance against OSNR. That is, plot 900 indicates test results for a similar test setup as that used to produce plot 700, FIG. 7, except for the uplink counterpart thereof, i.e., a 32-GBd DP-16QAM UL signal.

More particularly, the test results described above with respect to FIGS. 6-9 illustrates, for purposes of performance comparison, exemplary results for both FDX operation in non-FDX operation. For each of plots 600, 700, 800, 900, OIL-based child lasers were utilized for both transmitter and LO light sources. For reference purposes, and as further proof of concept, results of back-to-back (B2B) BER versus OSNR are also shown overlaid with the FDX/non-FDX results, and for both cases using either the parent ECL, or the child FPLD, as both transmitter and LO light sources.

As may be seen from FIGS. 6-9, when using the QPSK modulation format, FDX operation over a 80-km SMF link introduces a relatively small (i.e., 0.3-0.4 dB) penalty at both the HD-FEC threshold and the SD-FEC threshold. In contrast, when using 16 QAM modulation format, FDX operation may introduce an approximately 2-dB penalty at the HD-FEC threshold, and approximately a 1-dB penalty at the SD-FEC threshold. This FDX penalty arises mainly due to fiber scattering and back-reflection of both the fiber link and other components used in system 200.

Figure 10:
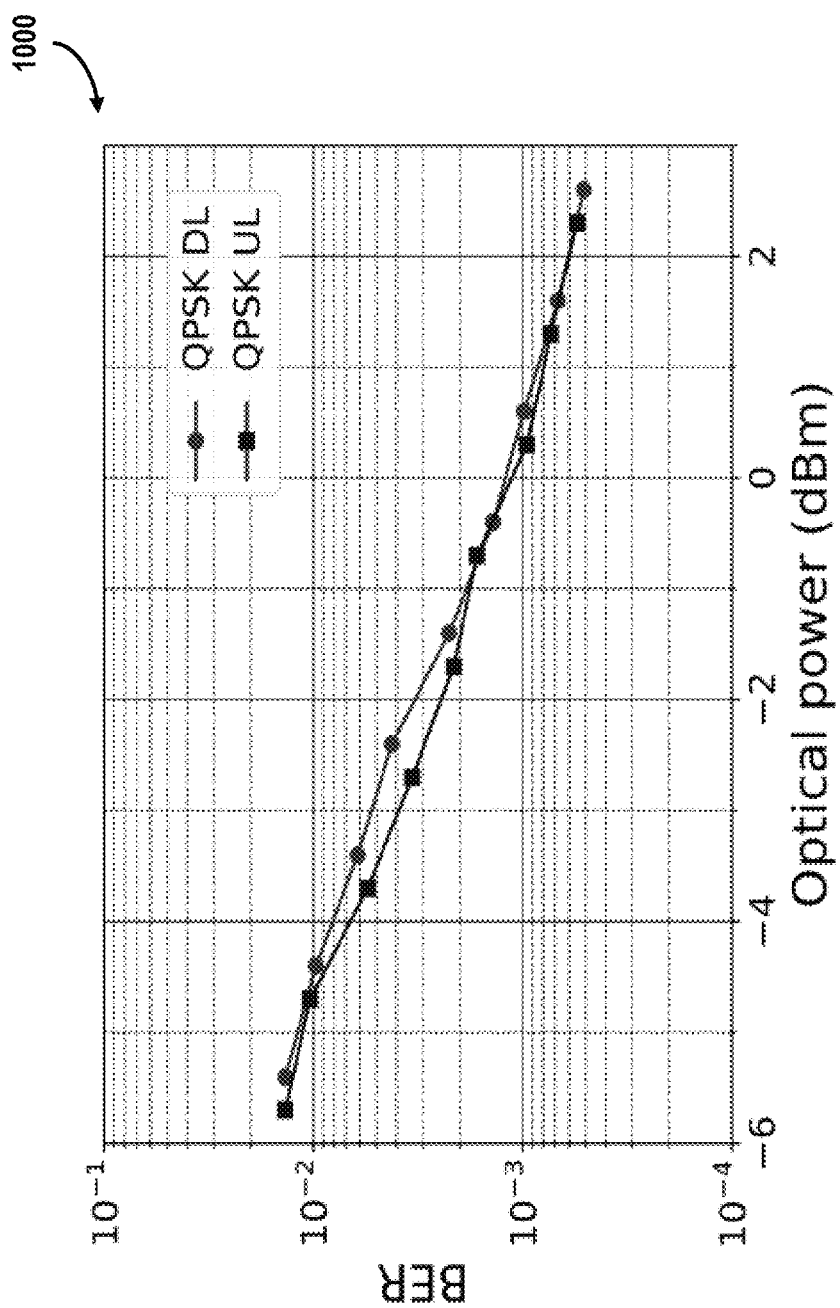
FIG. 10 is a graphical illustration depicting a comparative plot of bit-error-rate performance against optical power.

FIG. 10 is a graphical illustration depicting a comparative plot 1000 of BER performance against optical power. More particularly, plot 1000 illustrates BER performance test results versus optical power launched into the fiber, for both the DL and the UL, under FDX operation. As indicated in plot 1000, the BER performance increases as optical power decreases, with no clear observable indication of nonlinear impairments.

Figure 11:
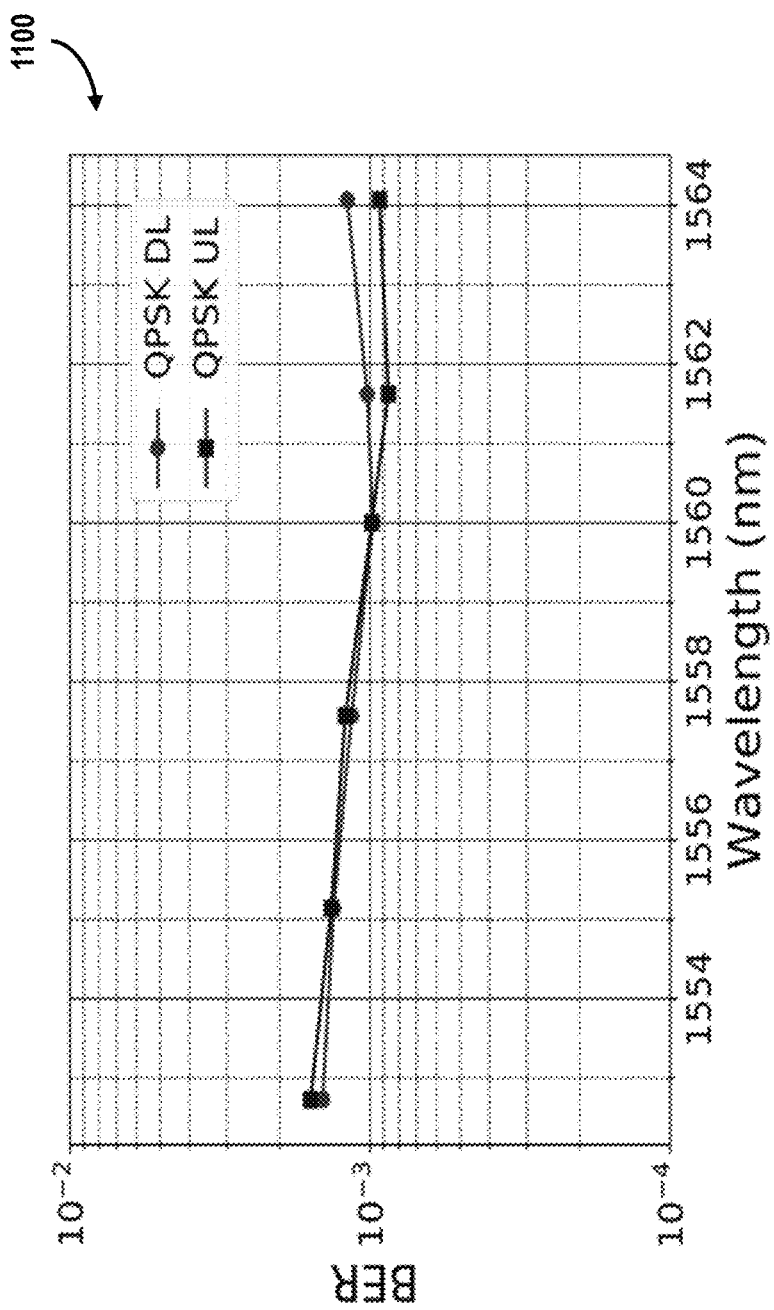
FIG. 11 is a graphical illustration depicting a comparative plot of bit-error-rate performance against wavelength.

FIG. 11 is a graphical illustration depicting a comparative plot 1100 of BER performance against wavelength. More particularly, for comparative purposes, the BER performance was also tested against various DP-QPSK wavelengths, and also for both the DL and the UL. That is, plot 1100 was produced by tuning the seed ECL wavelength for the comb sources, and then adjusting the corresponding WSS and optical filter channels. No significant variation in BER performance is indicated from plot 1100.

Figure 12:
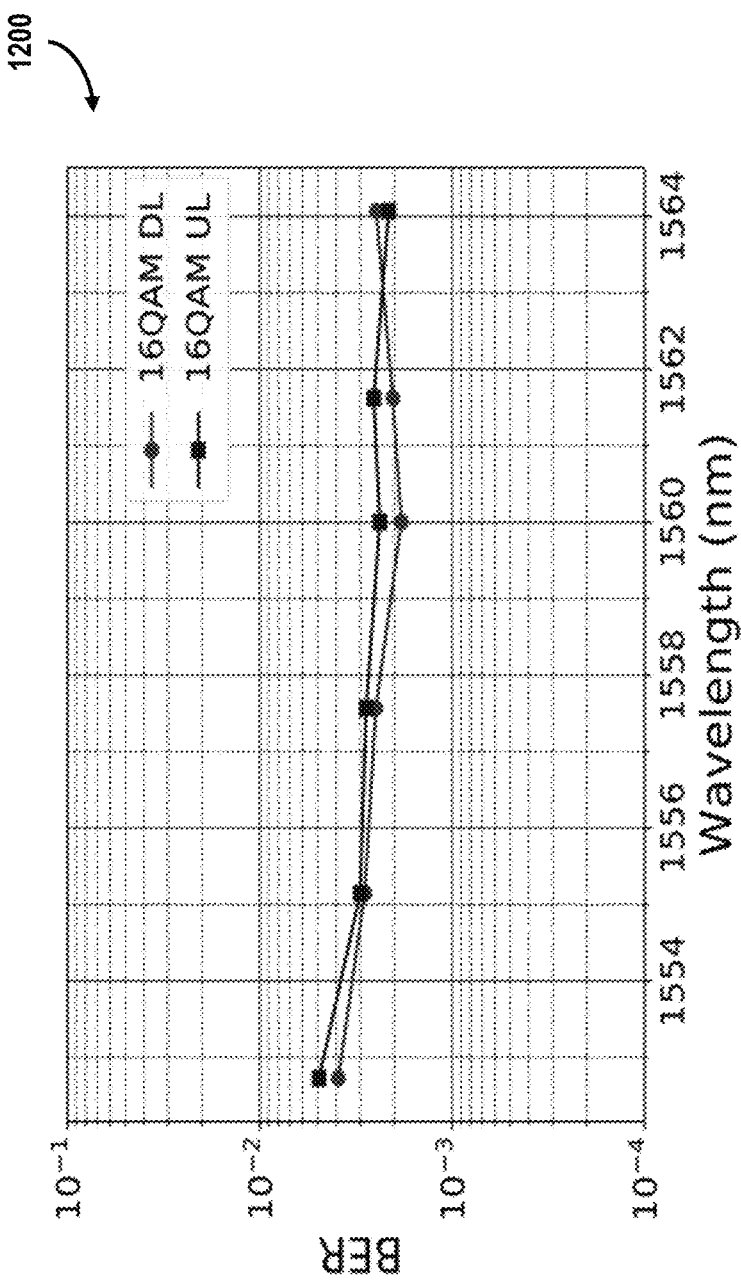
FIG. 12 is a graphical illustration depicting an alternative comparative plot of bit-error-rate performance against wavelength.

FIG. 12 is a graphical illustration depicting an alternative comparative plot 1200 of BER performance against wavelength. Plot 1200 is similar to plot 1100, FIG. 11, but was alternatively tested for various DP-16QAM wavelengths, as opposed to the DP-QPSK wavelength used to produce plot 11. As can be seen from plot 1200, again no significant variation in BER performance was observed.

For further comparative purposes, additional BER performance-versus-OSNR test results for various alternative permutations of test conditions, such as for (i) a DL or a UL transmission, (ii) a QPSK or a 16 QAM modulation wavelength, or (iii) for optical links of B2B, 25 km, 50 km, 75 km, and hundred kilometers, as described further below with respect to FIGS. 13-28.

Figure 13:
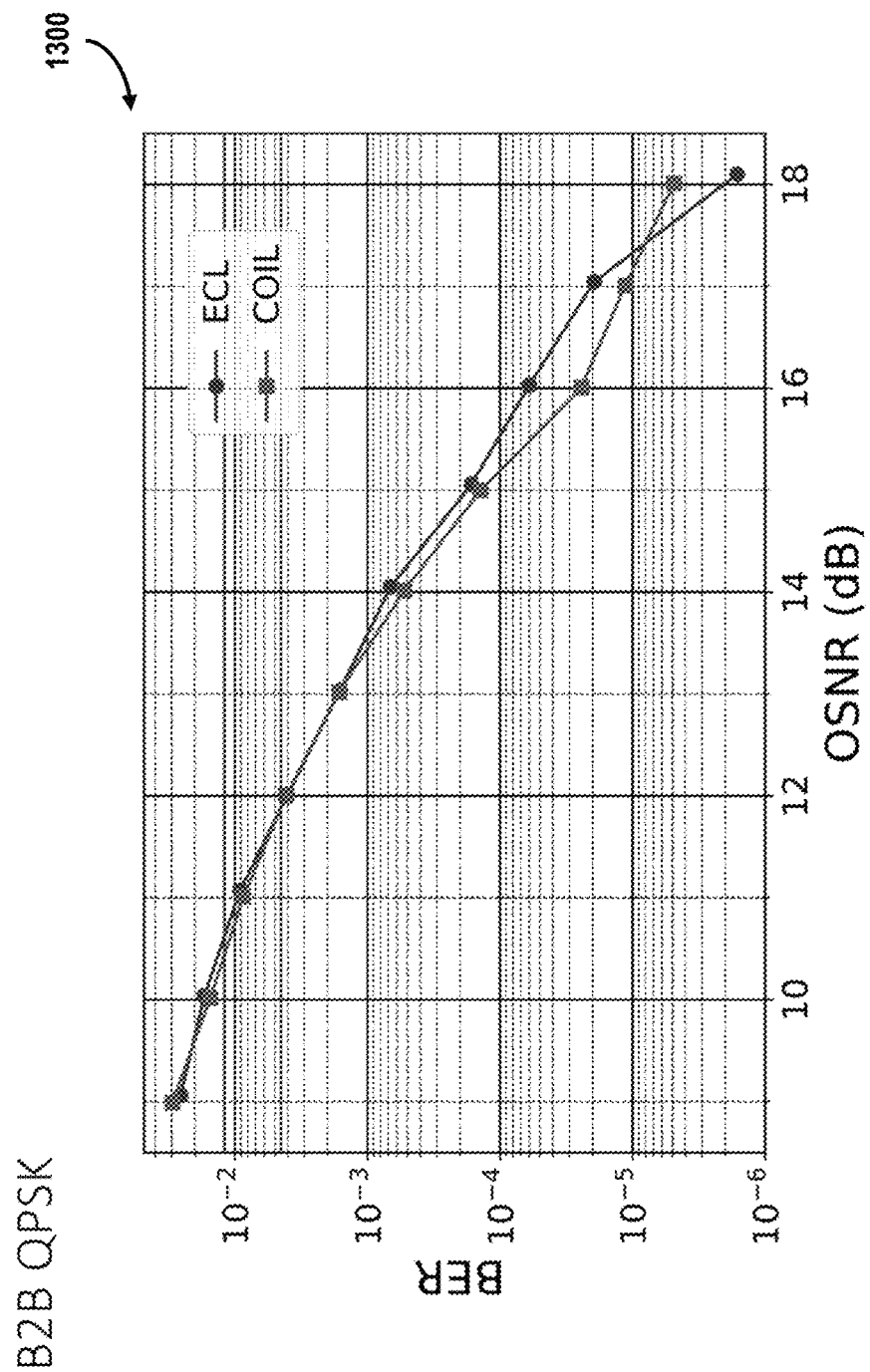
FIG. 13 is a graphical illustration depicting a comparative plot of bit-error-rate performance against optical signal-to-noise ratio for a back-to-back QPSK transmission measurement.

FIG. 13 is a graphical illustration depicting a comparative plot 1300 of BER performance against OSNR for a B2B QPSK transmission measurement. More specifically, comparative plot 1300 compares B2B QPSK transmission from the ECL parent laser with that from the COIL child laser, indicating results similar to that described above with respect to FIGS. 6 and 8.

Figure 14:
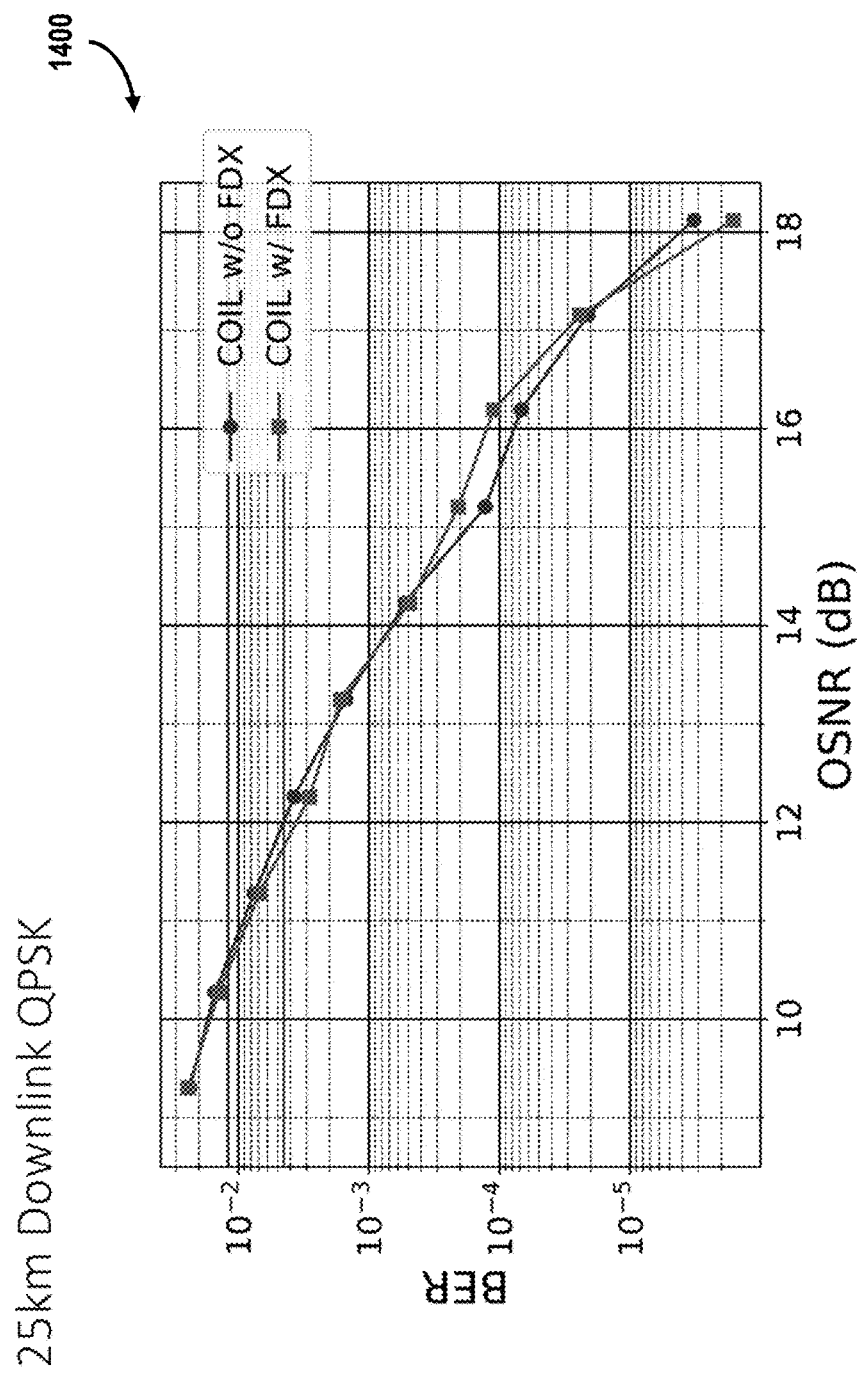
FIG. 14 is a graphical illustration depicting a comparative plot of bit-error-rate performance against optical signal-to-noise ratio for a 25 kilometer downlink QPSK transmission measurement.

FIG. 14 is a graphical illustration depicting a comparative plot 1400 of BER performance against OSNR for a 25 km downlink QPSK transmission measurement. More specifically, comparative plot 1400 compares the DL QPSK transmission of a COIL child laser in an FDX setup with that of a non-FDX setup, and over a 25 km SMF optical link, with no significant observable variation therebetween.

Figure 15:
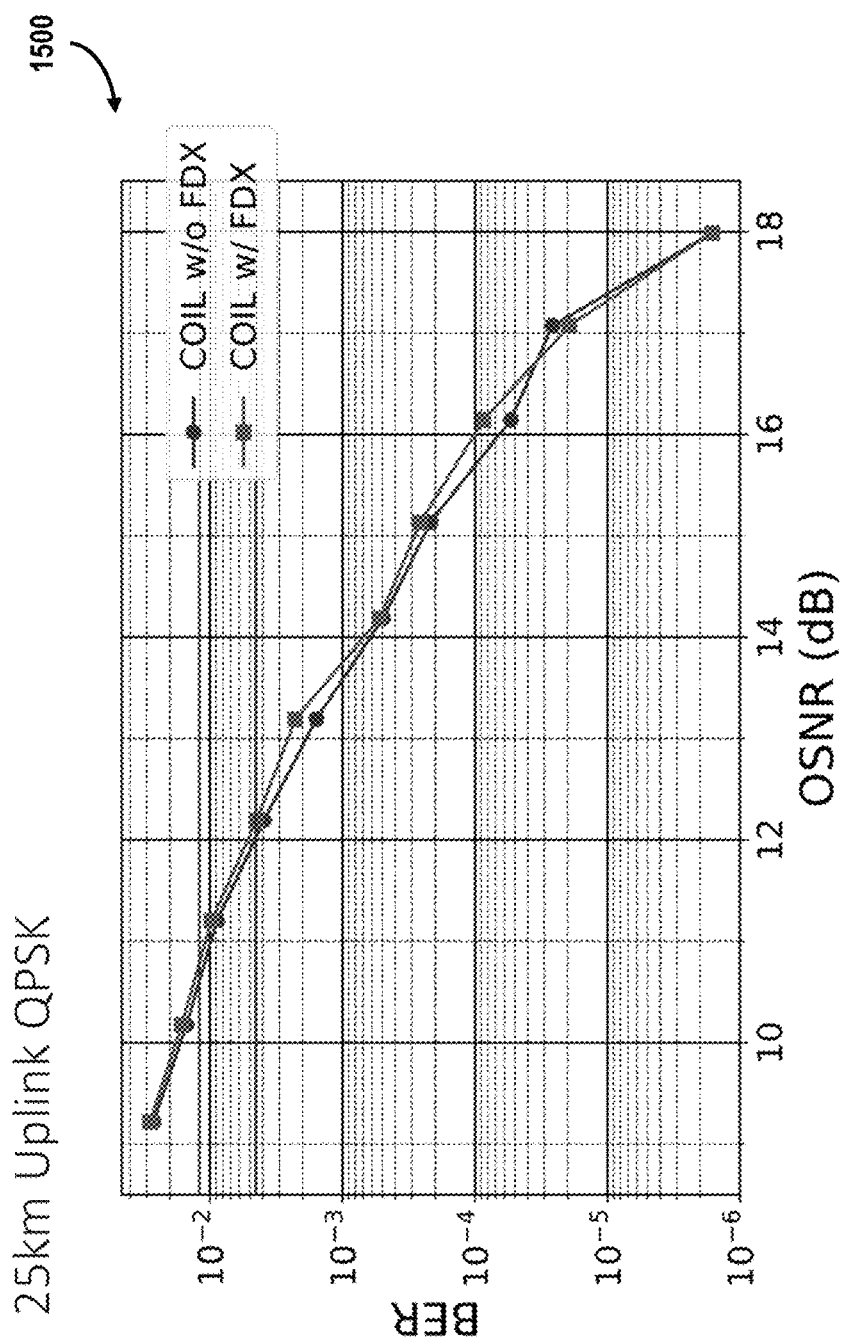
FIG. 15 is a graphical illustration depicting a comparative plot of bit-error-rate performance against optical signal-to-noise ratio for a 25 kilometer uplink QPSK transmission measurement.

FIG. 15 is a graphical illustration depicting a comparative plot 1500 of BER performance against OSNR for a 25 km uplink QPSK transmission measurement. Comparative plot 1500 is similar to comparative plot 1400, FIG. 14, except for the UL QPSK transmission, as opposed to the DL transmission. Again, no significant observable variation is demonstrated.

Figure 16:
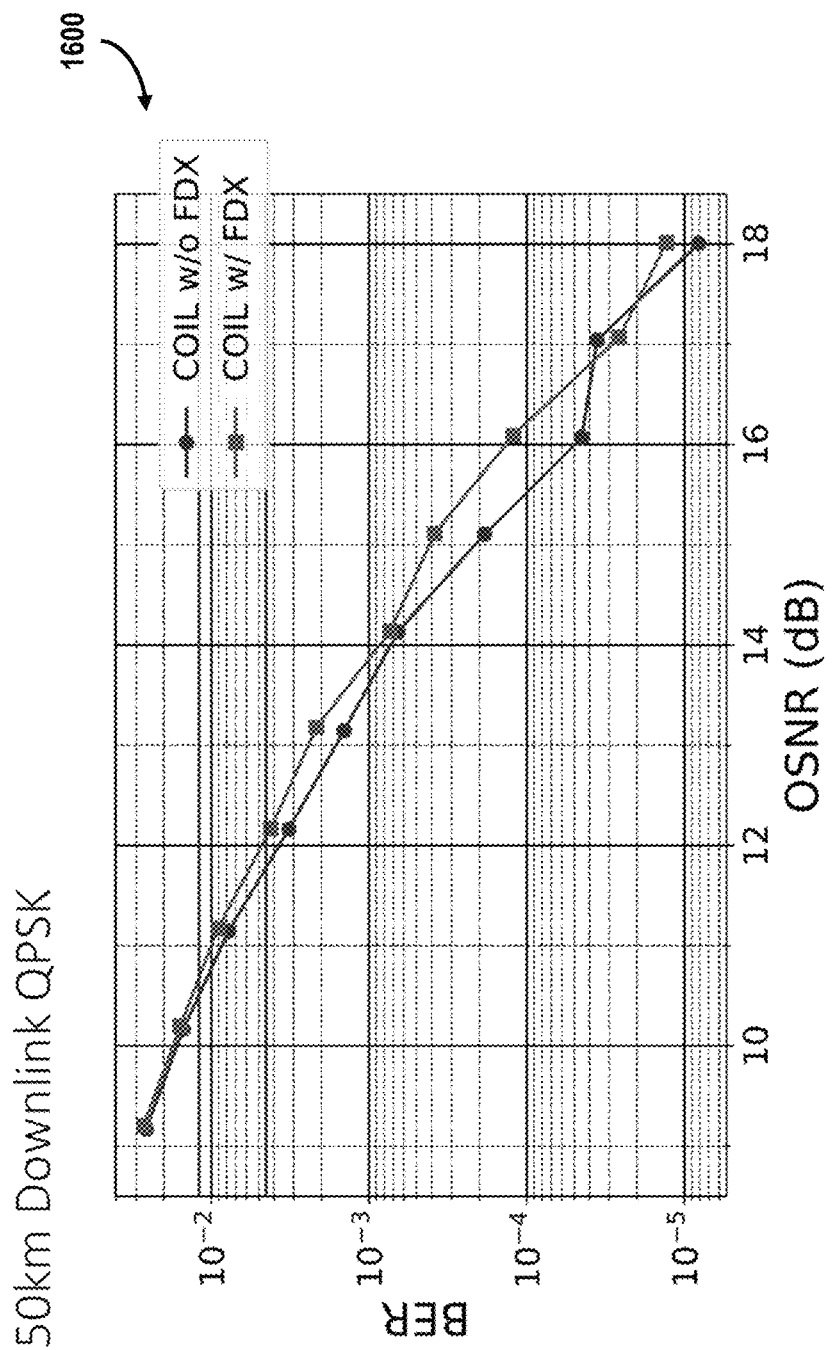
FIG. 16 is a graphical illustration depicting a comparative plot of bit-error-rate performance against optical signal-to-noise ratio for a 50 kilometer downlink QPSK transmission measurement.

FIG. 16 is a graphical illustration depicting a comparative plot 1600 of BER performance against OSNR for a 50 km downlink QPSK transmission measurement. Comparative plot 1600 is similar to comparative plot 1400, FIG. 14, except for a 50 km SMF optical link, instead of 25 km. From comparative plot 1600, a slightly larger variation between respective OSNR values may be observed.

Figure 17:
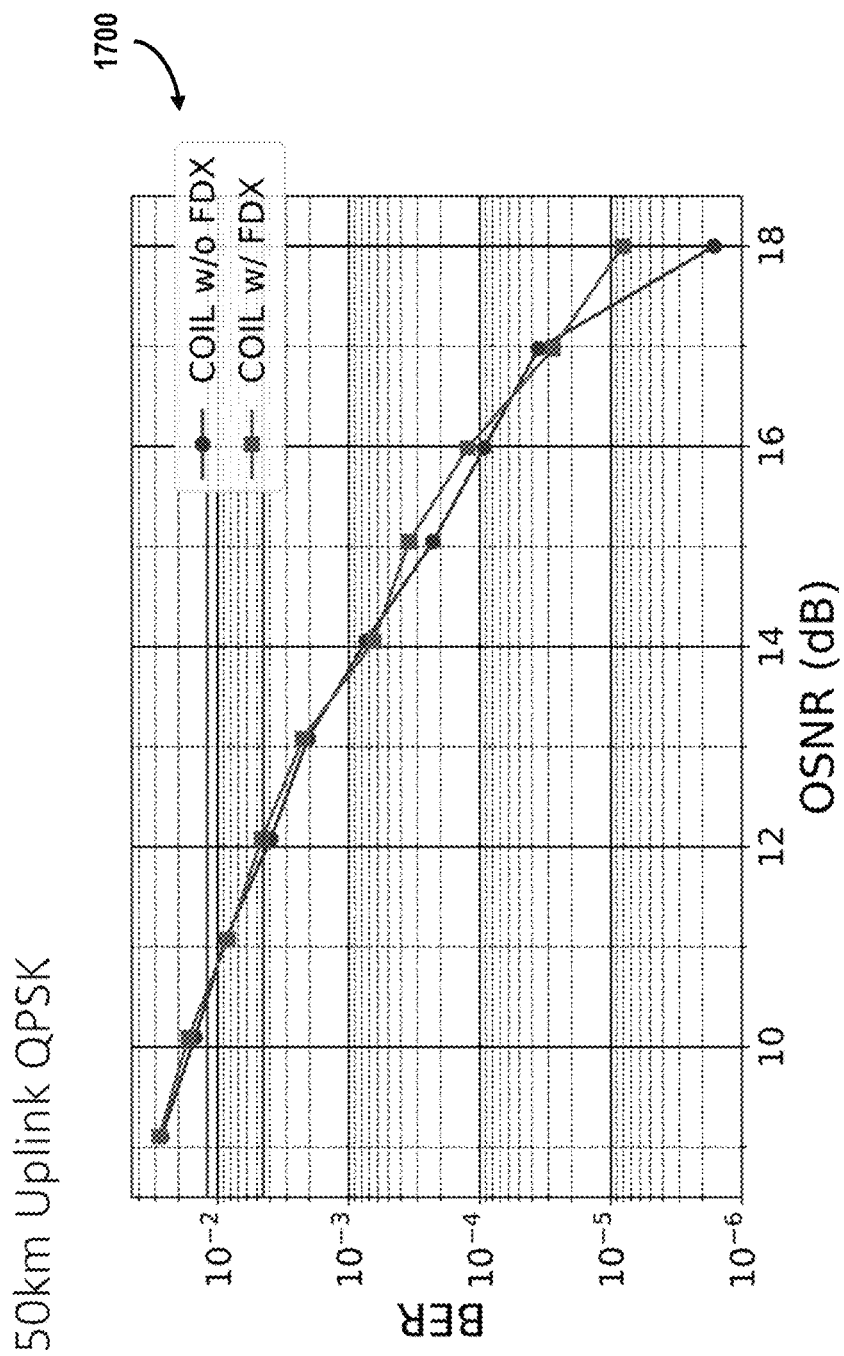
FIG. 17 is a graphical illustration depicting a comparative plot of bit-error-rate performance against optical signal-to-noise ratio for a 50 kilometer uplink QPSK transmission measurement.

FIG. 17 is a graphical illustration depicting a comparative plot 1700 of BER performance against OSNR for a 50 km uplink QPSK transmission measurement. Comparative plot 1700 is similar to comparative plot 1600, FIG. 16, except for the UL QPSK transmission, as opposed to the DL transmission. However, for the UL transmission, less OSNR variation is observable.

Figure 18:
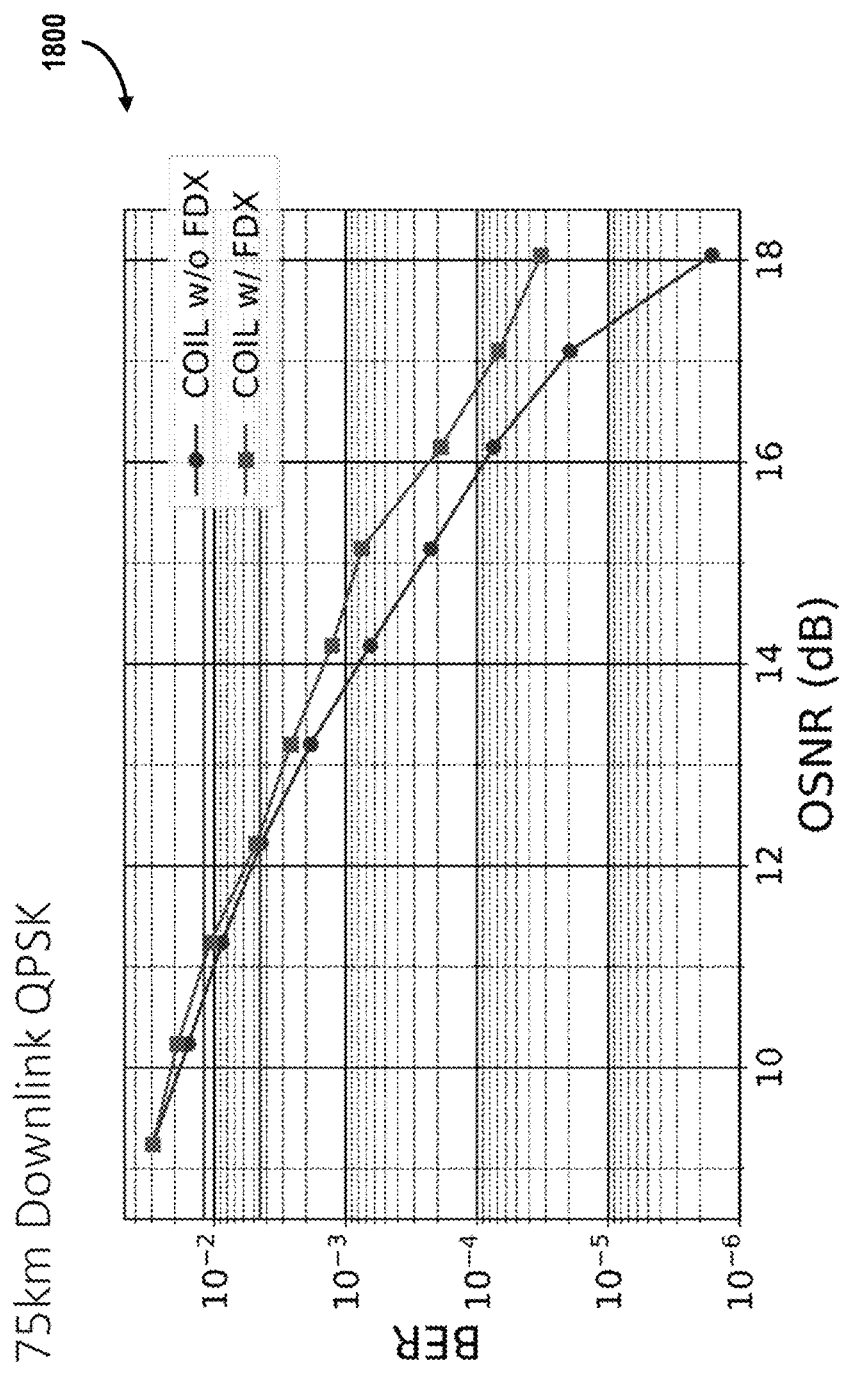
FIG. 18 is a graphical illustration depicting a comparative plot of bit-error-rate performance against optical signal-to-noise ratio for a 75 kilometer downlink QPSK transmission measurement.

FIG. 18 is a graphical illustration depicting a comparative plot 1800 of BER performance against OSNR for a 75 km downlink QPSK transmission measurement. Comparative plot 1800 is similar to comparative plot 1400, FIG. 14, except for a 75 km SMF optical link, instead of 25 km. From comparative plot 1800, a more significant variation is observable as OSNR increases over this longer fiber deployment.

Figure 19:
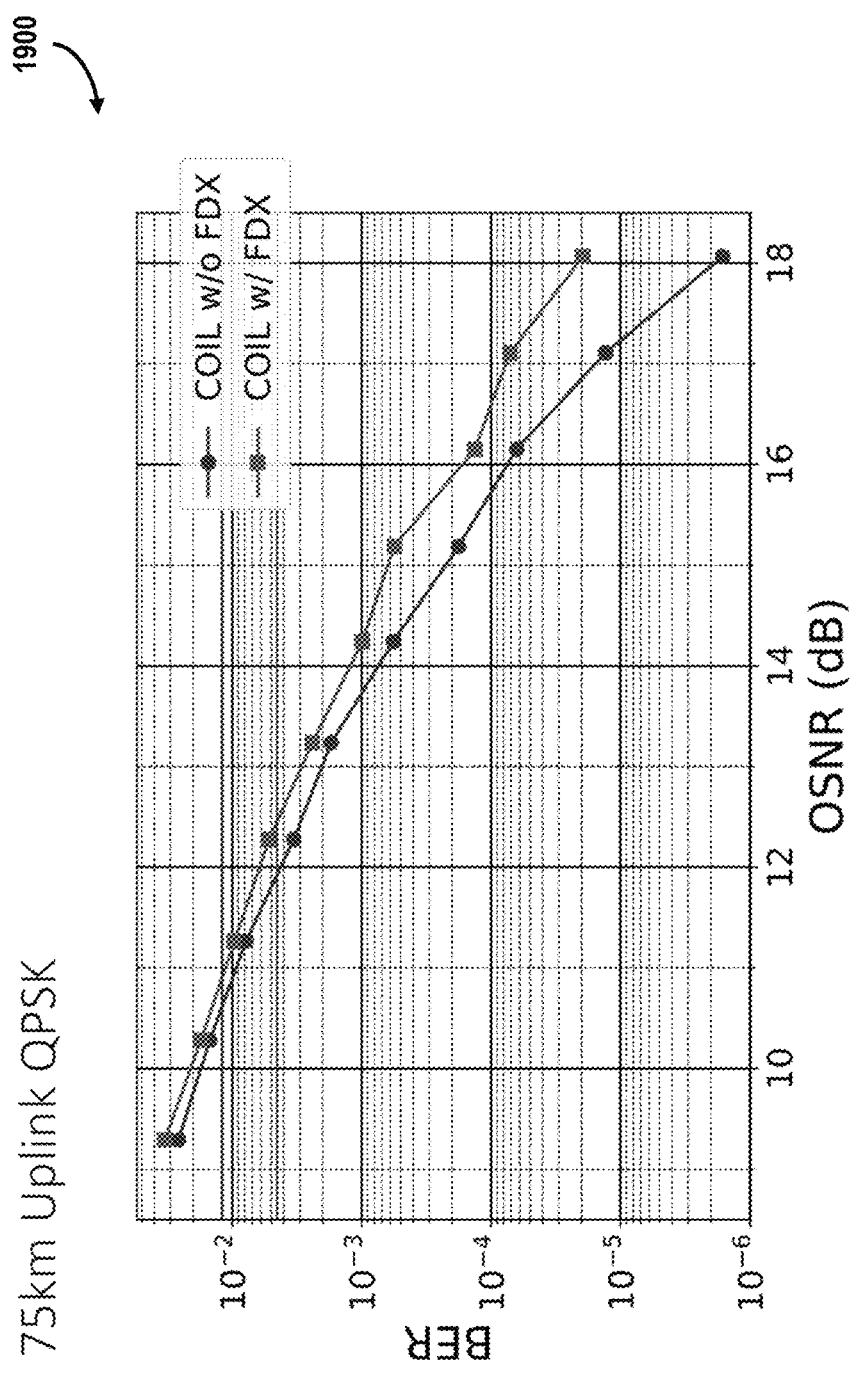
FIG. 19 is a graphical illustration depicting a comparative plot of bit-error-rate performance against optical signal-to-noise ratio for a 75 kilometer uplink QPSK transmission measurement.

FIG. 19 is a graphical illustration depicting a comparative plot 1900 of BER performance against OSNR for a 75 km uplink QPSK transmission measurement. Comparative plot 1900 is similar to comparative plot 1800, FIG. 18, except for the UL QPSK transmission, as opposed to the DL transmission. From comparative plot 1900, a variation for increasing OSNR values may be observed in the UL transmission, similar to that of the DL transmission.

Figure 20:
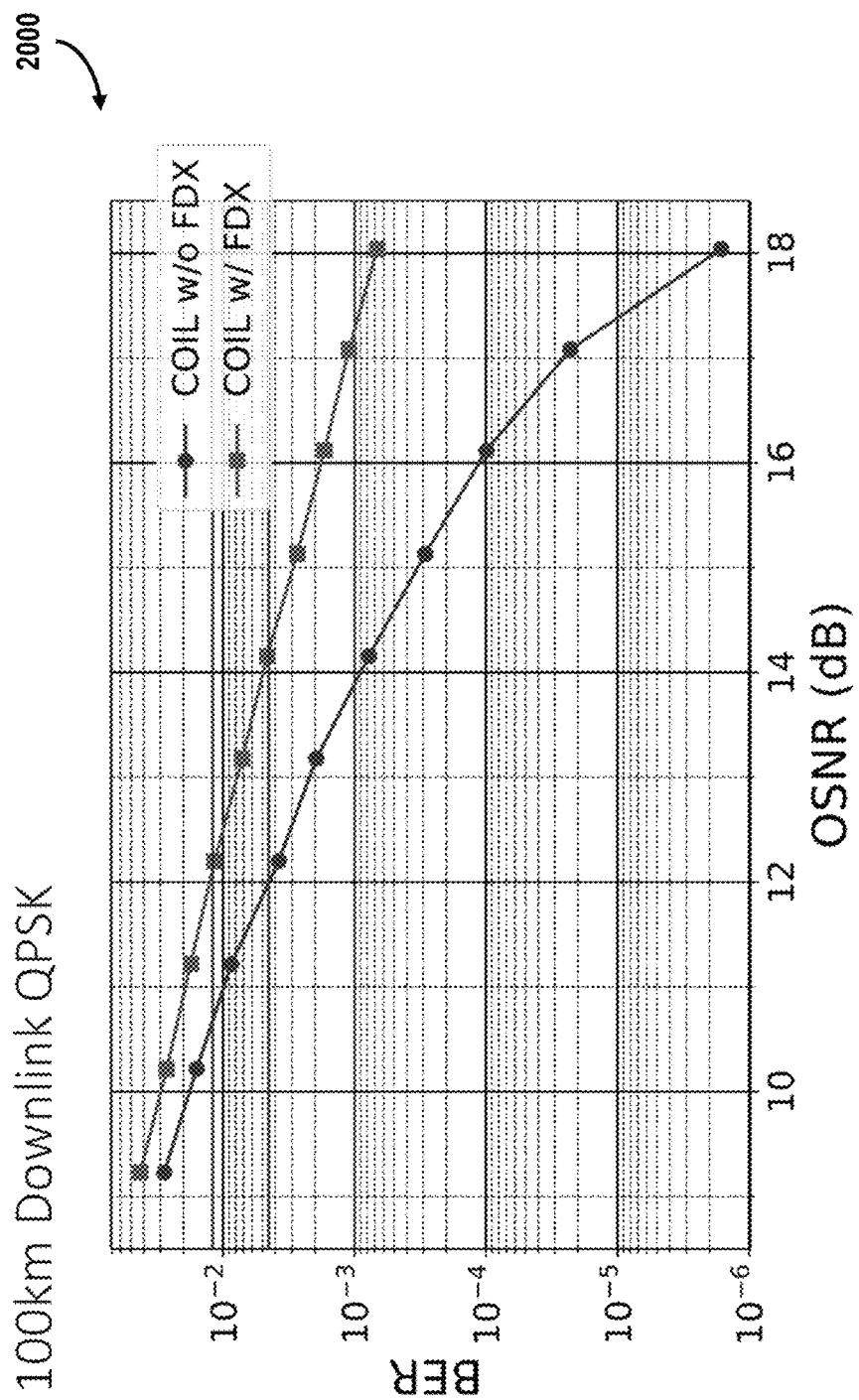
FIG. 20 is a graphical illustration depicting a comparative plot of bit-error-rate performance against optical signal-to-noise ratio for a 100 kilometer downlink QPSK transmission measurement.

FIG. 20 is a graphical illustration depicting a comparative plot 2000 of BER performance against OSNR for a 100 km downlink QPSK transmission measurement. Comparative plot 2000 is similar to comparative plot 1400, FIG. 14, except for a 100 km SMF optical link, instead of 25 km. From comparative plot 2000, an even greater variation is observable for increasing OSNR values, as the length of the optical link similarly increases.

Figure 21:
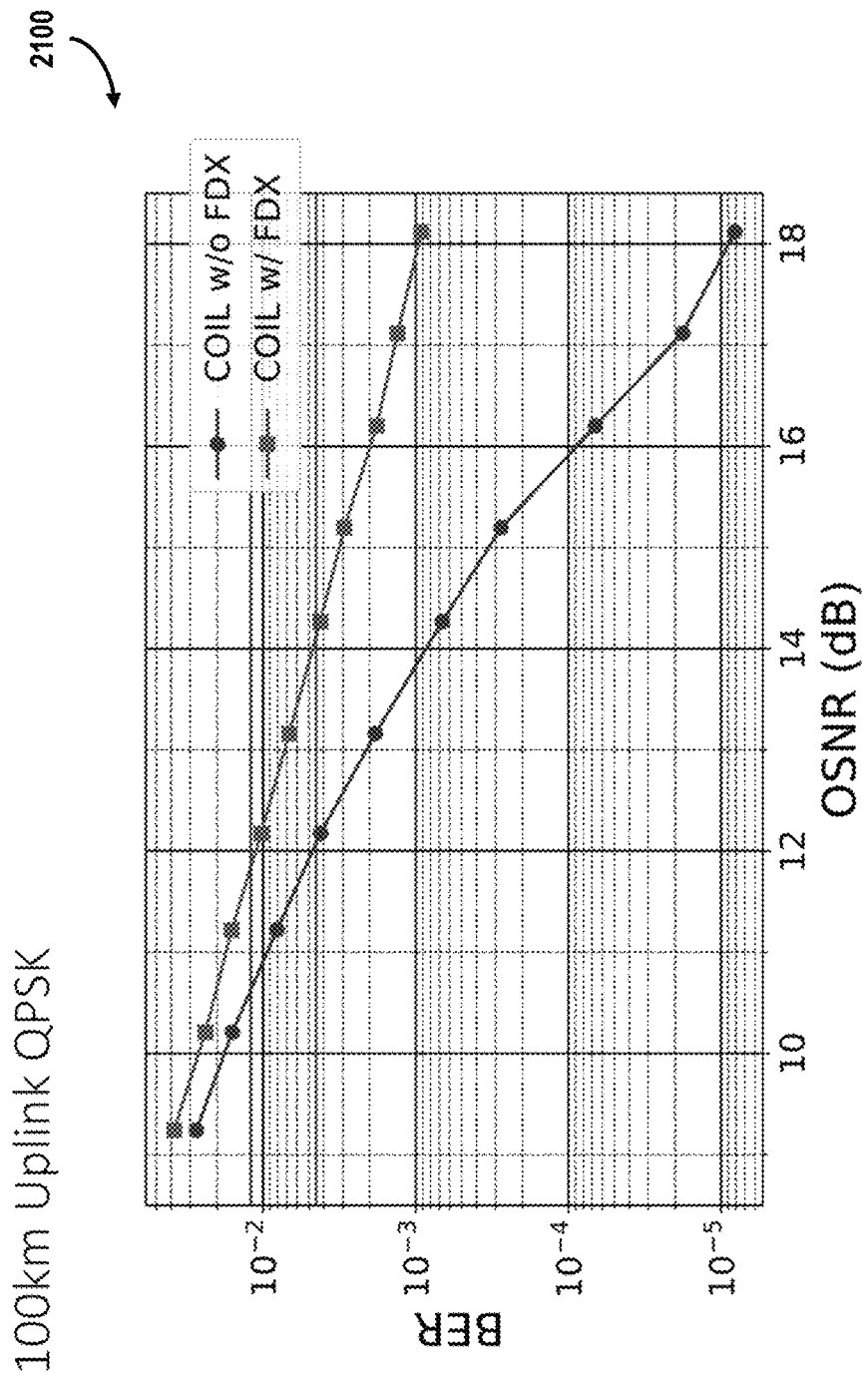
FIG. 21 is a graphical illustration depicting a comparative plot of bit-error-rate performance against optical signal-to-noise ratio for a 100 kilometer uplink QPSK transmission measurement.

FIG. 21 is a graphical illustration depicting a comparative plot 2100 of BER performance against OSNR for a 100 km uplink QPSK transmission measurement. Comparative plot 2100 is similar to comparative plot 2000, FIG. 20, except for the UL QPSK transmission, as opposed to the DL transmission. From comparative plot 2100, a similarly widening variation for increasing OSNR values may be observed in the UL transmission, as with the DL transmission.

Figure 22:
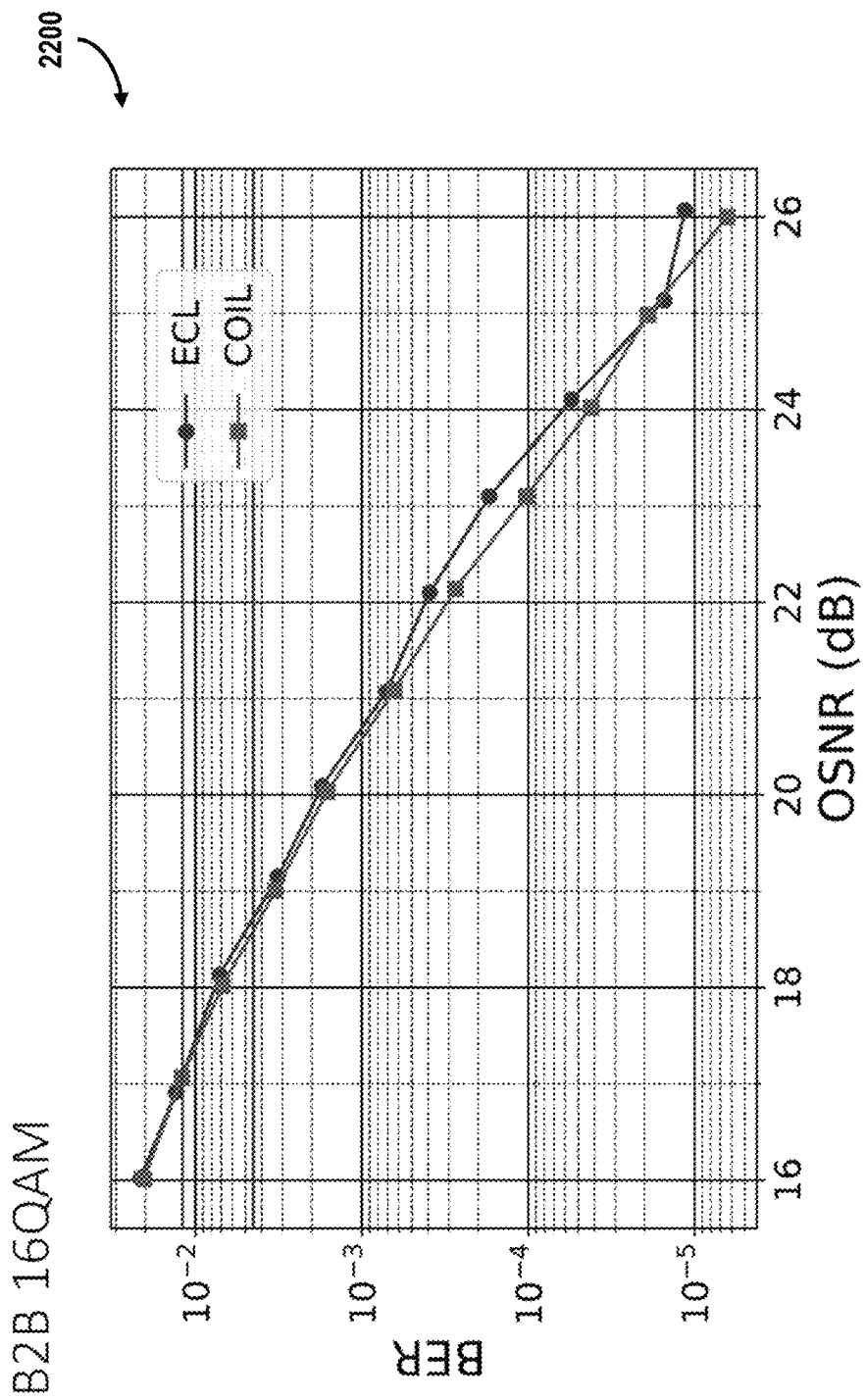
FIG. 22 is a graphical illustration depicting a comparative plot of bit-error-rate performance against optical signal-to-noise ratio for a back-to-back 16 QAM transmission measurement.

FIG. 22 is a graphical illustration depicting a comparative plot 2200 of BER performance against OSNR for a B2B 16 QAM transmission measurement. More specifically, comparative plot 2200 is similar to plot 1300, FIG. 13, except for 16 QAM wavelength results being illustrated, as opposed to the QPSK wavelength results illustrated in comparative plot 1300. From comparative plot 2200, results similar to that described above with respect to FIGS. 7 and 9 may be observed.

Figure 23:
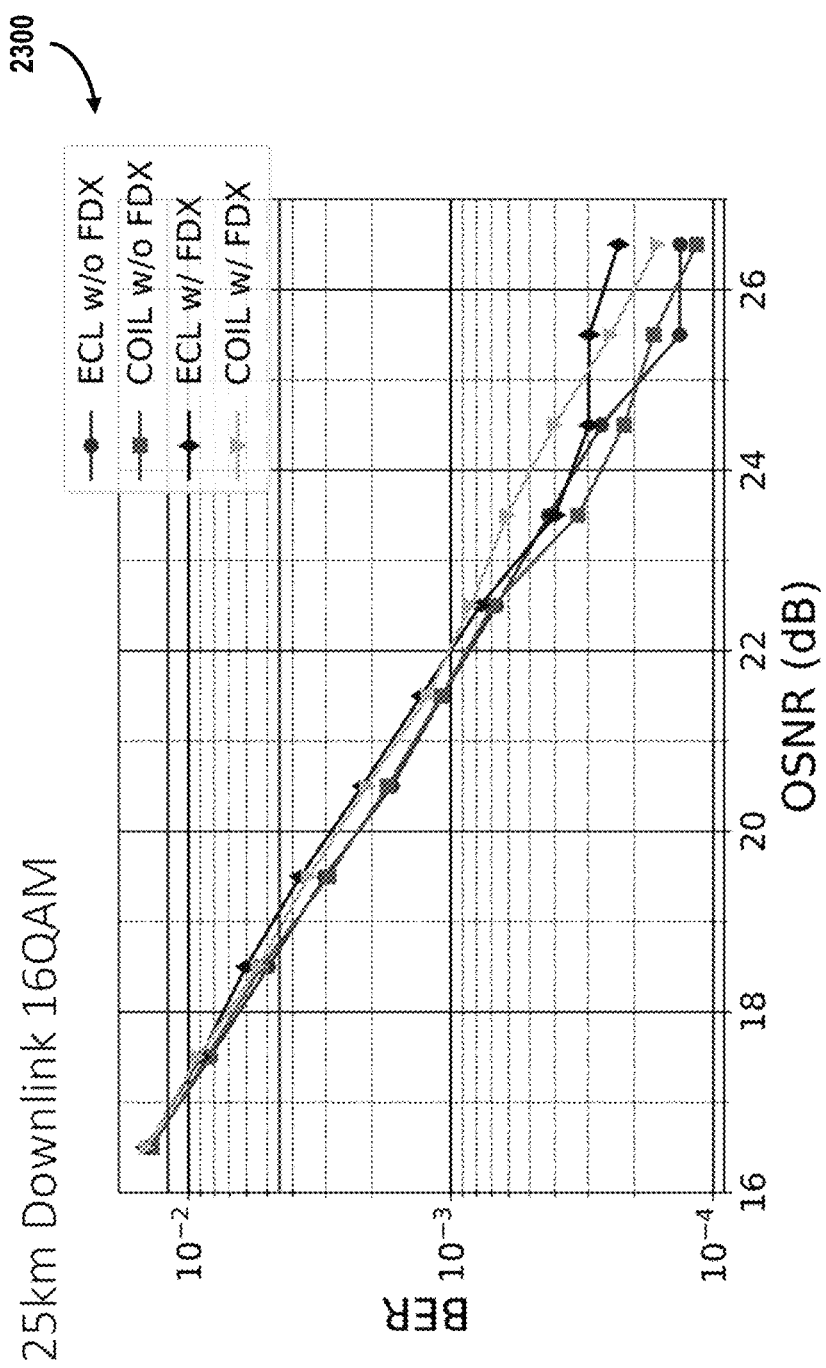
FIG. 23 is a graphical illustration depicting a comparative plot of bit-error-rate performance against optical signal-to-noise ratio for a 25 kilometer downlink 16 QAM transmission measurement.

FIG. 23 is a graphical illustration depicting a comparative plot 2300 of BER performance against OSNR for a 25 km downlink 16 QAM transmission measurement. More specifically, comparative plot 2300 is similar to comparative plot 1400, FIG. 14, except that comparative plot 2300 illustrates FDX and non-FDX 16 QAM wavelength results instead of the QPSK wavelength results illustrated in comparative plot 1400, and further compares these test results either case of the ECL parent laser or the COIL child laser used as the transmission light sources. As indicated by comparative plot 2300, a slightly higher variation may be observed for increasing OSNR values in the FDX-versus-non-FDX comparison, as opposed to the ECL-versus-COIL source comparison.

Figure 24:
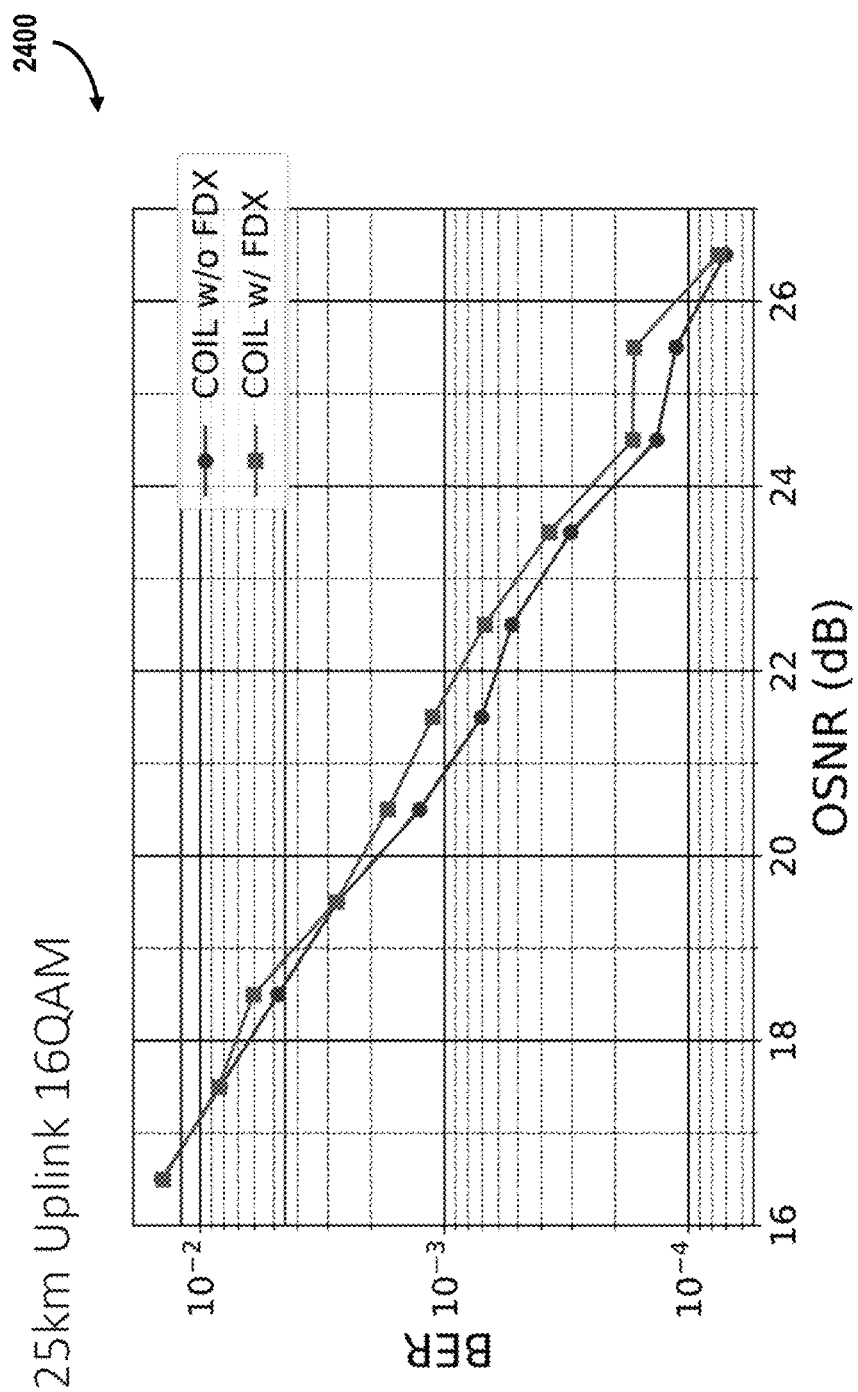
FIG. 24 is a graphical illustration depicting a comparative plot of bit-error-rate performance against optical signal-to-noise ratio for a 25 kilometer uplink 16 QAM transmission measurement.

FIG. 24 is a graphical illustration depicting a comparative plot 2400 of BER performance against OSNR for a 25 km uplink 16 QAM transmission measurement. Comparative plot 2400 is similar to comparative plot 1500, FIG. 15, except that comparative plot 2300 illustrates 16 QAM wavelength results instead of the QPSK wavelength results illustrated in comparative plot 1500. As indicated by comparative plot 2300, a slightly greater variation may be observed for the 16 QAM scenario then for the QPSK scenario illustrated in FIG. 15.

Figure 25:
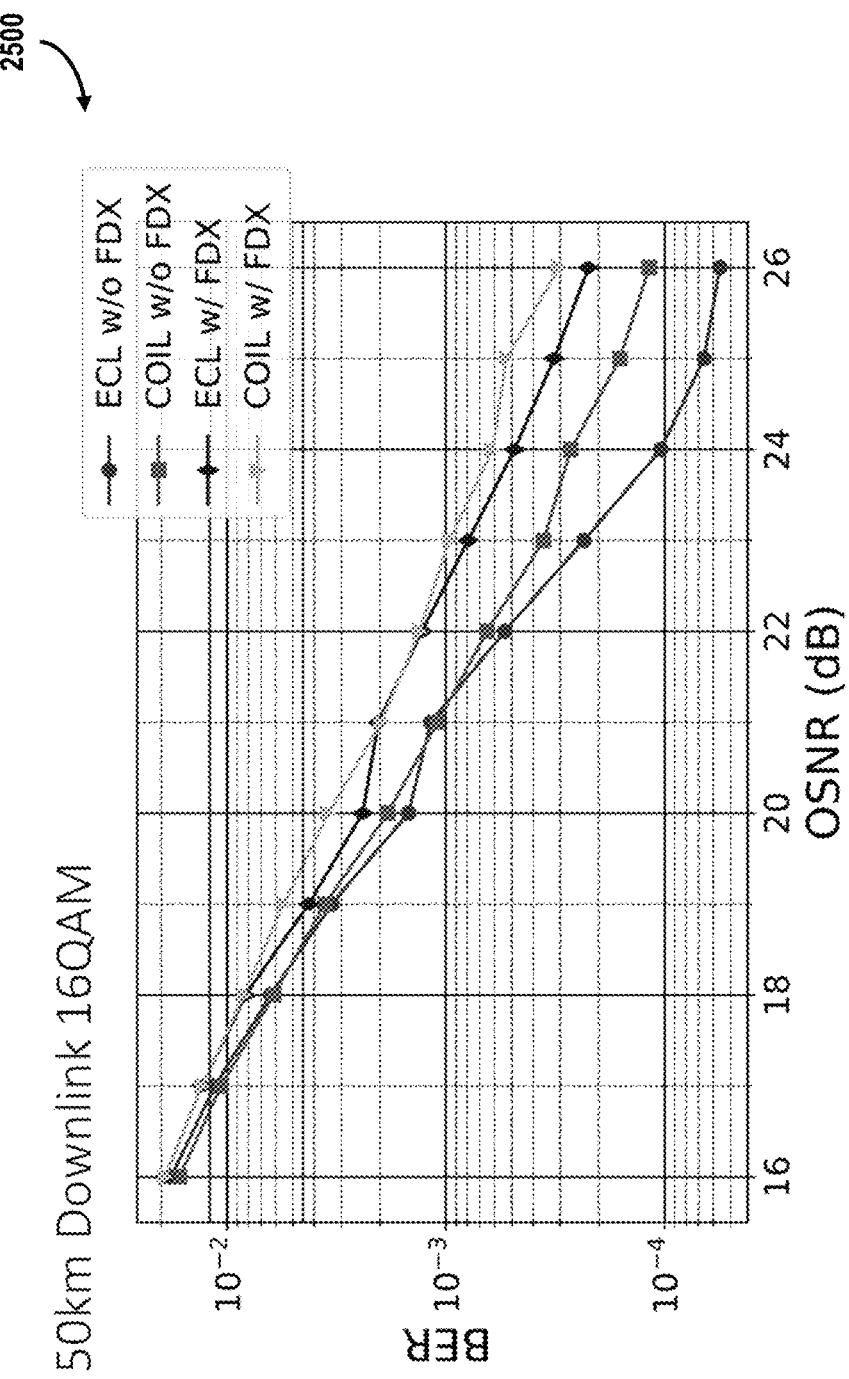
FIG. 25 is a graphical illustration depicting a comparative plot of bit-error-rate performance against optical signal-to-noise ratio for a 50 kilometer downlink 16 QAM transmission measurement.

FIG. 25 is a graphical illustration depicting a comparative plot 2500 of BER performance against OSNR for a 50 km downlink 16 QAM transmission measurement. Comparative plot 2500 is similar to comparative plot 2400, FIG. 24, except for a 50 km SMF optical link, instead of 25 km.

Figure 26:
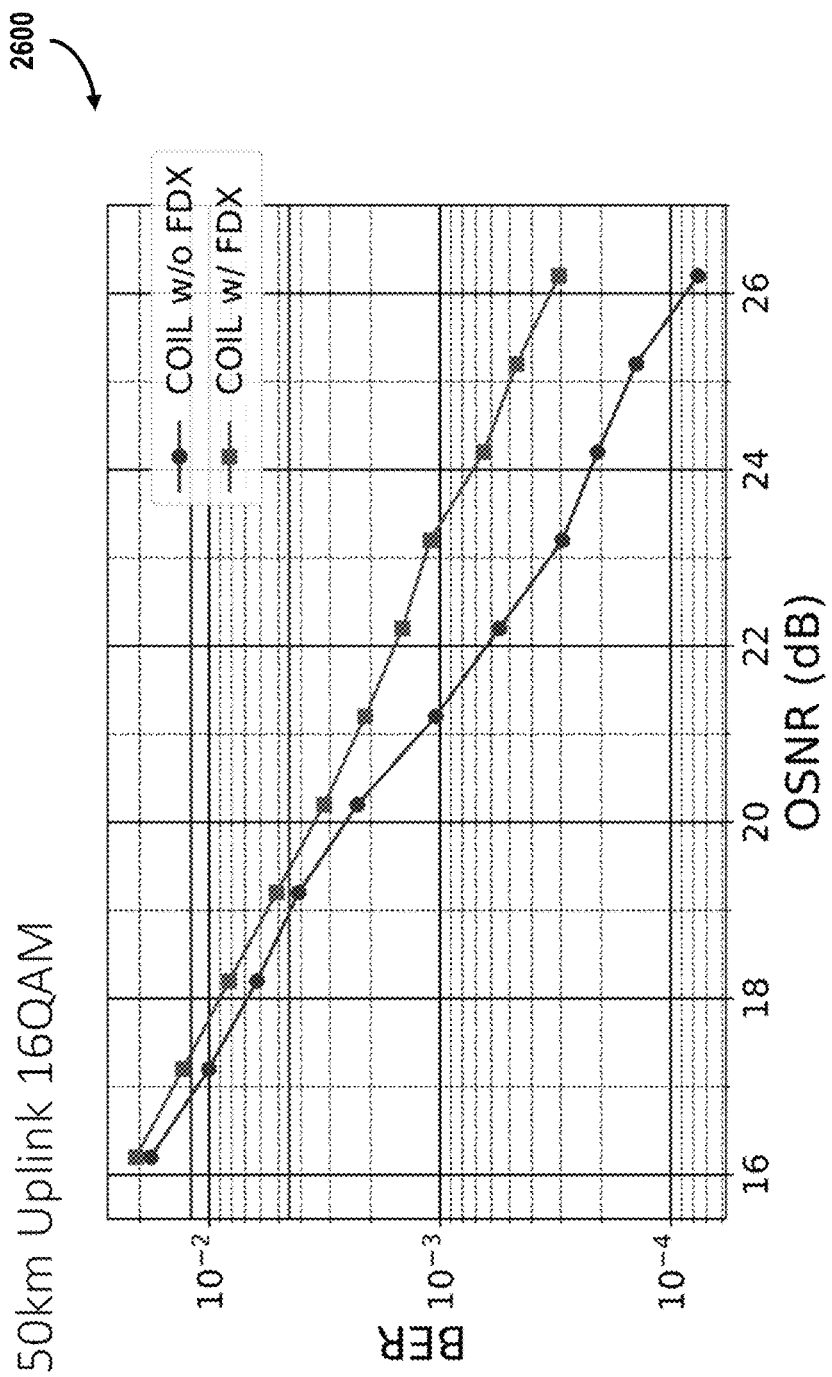
FIG. 26 is a graphical illustration depicting a comparative plot of bit-error-rate performance against optical signal-to-noise ratio for a 50 kilometer uplink 16 QAM transmission measurement.

FIG. 26 is a graphical illustration depicting a comparative plot 2600 of BER performance against OSNR for a 50 km uplink 16 QAM transmission measurement. Comparative plot 2600 is similar to plot 1700, FIG. 17, except for 16 QAM wavelength results being illustrated instead of the QPSK wavelength results illustrated in comparative plot 1700.

Figure 27:
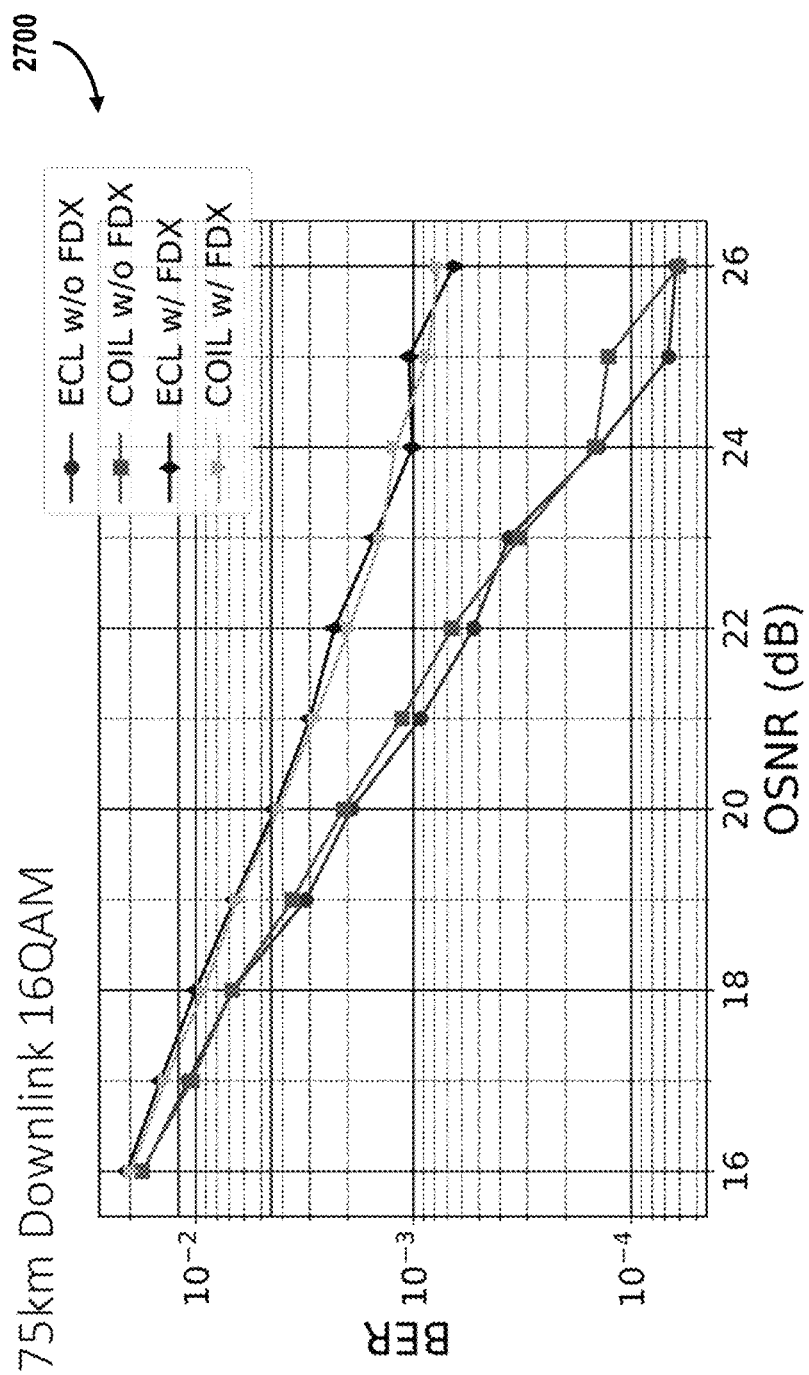
FIG. 27 is a graphical illustration depicting a comparative plot of bit-error-rate performance against optical signal-to-noise ratio for a 75 kilometer downlink 16 QAM transmission measurement.

FIG. 27 is a graphical illustration depicting a comparative plot 2700 of BER performance against OSNR for a 75 km downlink 16 QAM transmission measurement. Comparative plot 2700 is similar to comparative plot 2400, FIG. 24, except for a 75 km SMF optical link, instead of 25 km.

Figure 28:
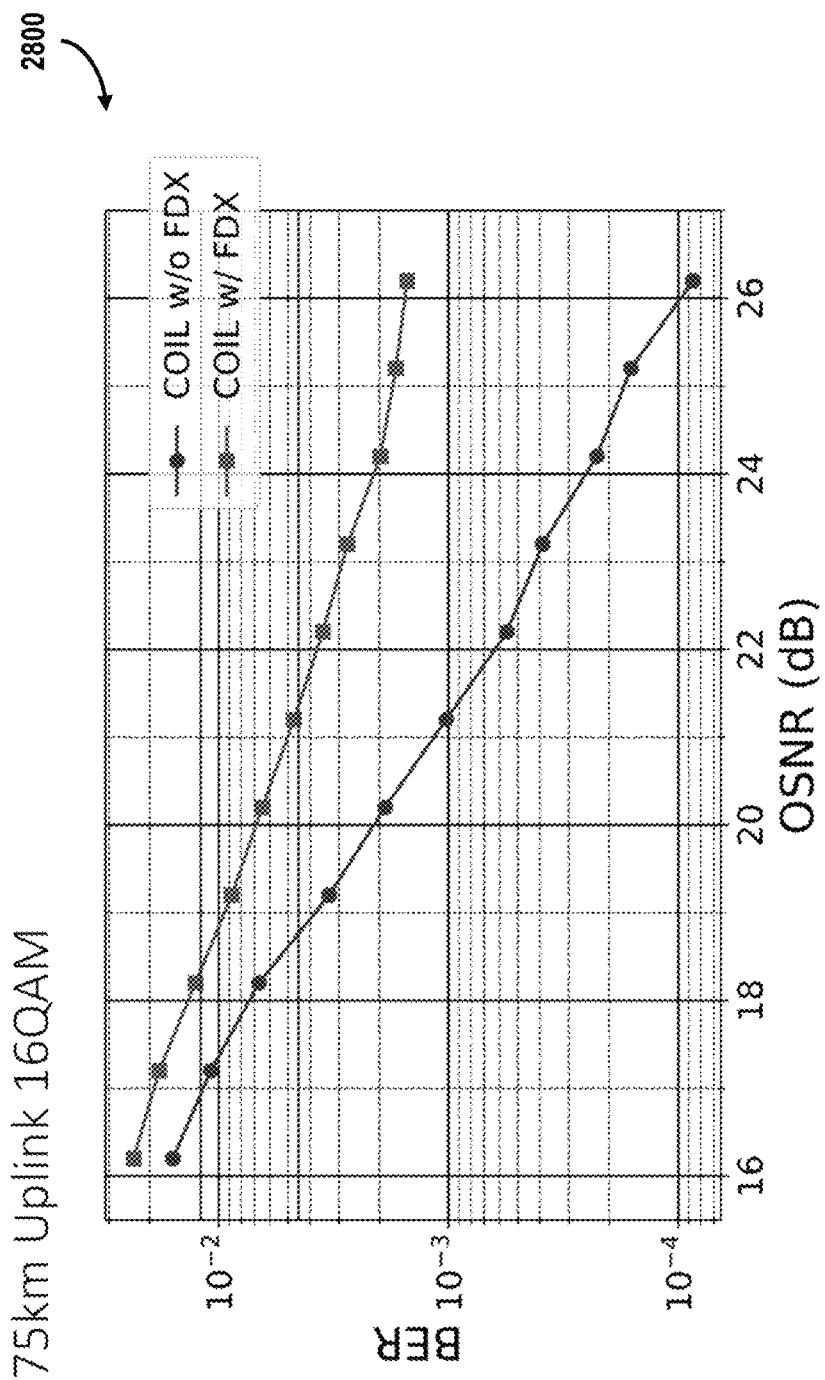
FIG. 28 is a graphical illustration depicting a comparative plot of bit-error-rate performance against optical signal-to-noise ratio for a 75 kilometer uplink 16 QAM transmission measurement.

FIG. 28 is a graphical illustration depicting a comparative plot 2800 of BER performance against OSNR for a 75 km uplink 16 QAM transmission measurement. Comparative plot 2800 is similar to plot 1800, FIG. 18, except for 16 QAM wavelength results being illustrated instead of the QPSK wavelength results illustrated in comparative plot 1800.

According to the embodiments described herein, an innovative P2P coherent optical link is achieved using efficient optical injection locking techniques together with a novel optical frequency dual-comb configuration. The present systems and methods additionally demonstrate particular usefulness for both WDM systems, as well as single-wavelength FDX SMF optical links up to 80 km and greater.

Exemplary OIL/COIL applications are described above by way of example, and not in a limiting sense. Additional OIL implementations may be utilized instead of, or in addition to, the foregoing embodiments without departing from the scope herein. Examples of such complementary OIL implementations are described in greater detail in U.S Pat. No. 11,115,126, issued Sep. 7, 2021, in U.S Pat. No. 10,965,393, issued Mar. 30, 2021, U.S Pat. No. 10,623,104, issued Apr. 14, 2020, U.S Pat. No. 10,944,478, issued Mar. 9, 2021, and in co-pending U.S. patent application Ser. No. 17/187,237, filed Feb. 26, 2021. The disclosures of all of these previous references are incorporated by reference herein in their entireties.

Furthermore, the multiple test results described above for the various iterations and permutations of OIL/COIL applications for both coherent transmitters and coherent receivers indicate additional utility for both FDX and non-FDX optical networks or PONs, and in both the uplink and downlink transmissions, as well as for various modulations (e.g., QPSK, 16 QAM, etc.). According to the present disclosure, utilization of dual-polarization optical transmitters is particularly beneficial for not only longhaul applications, but also for shortreach applications to reduce the cost of electronic hardware, while also rendering the overall network system architecture more compact.

The present systems and methods therefore further improve upon existing solutions to the conventional problem of synchronizing two laser sources over a long period of time. Utilization of two opposing, phase-synchronized comb generators, as described herein, further enables continual synchronization of the various laser sources throughout the system during the entire operation of the system, and while nearly doubling the available bandwidth achieved by previous solutions. The present embodiments may be therefore cost-effectively implemented within coherent DWDM-PON system architectures for access networks in the same manner as these previous solutions, and for a significant increase in the available bandwidth relative to a minor hardware cost increase.

Access networks according to the present systems and methods thus achieve more efficient transmission of wavelengths through optical fibers, thereby increasing the capacity of transmitted data, but at lower power, increased sensitivity, lower hardware cost, and a reduction in dispersion, DSP compensation, and error correction. For ease of explanation, and not in a limiting sense, the foregoing embodiments are described with respect to single bidirectional optical fiber architectures for access network communication systems. The person of ordinary skill in the art though, will understand that the principles described herein are further applicable to dual-fiber systems as well as networks employing FSO transmission or other wireless technologies, and are further of particular applicability and usefulness in data centers and/or to the DCI paradigm, i.e., both intra- and inter-data center connections.

Exemplary embodiments of OIL-based communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user place.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An optical communication network including (a) a primary laser source, (b) a first comb generator configured to generate a first plurality of comb tones having a constant frequency spacing with respect to one another, and (c) a first transceiver including (i) a first transmitter having a first secondary laser with a resonator frequency being injection locked to a center frequency of a single longitudinal mode corresponding to a particular comb tone of the first plurality of comb tones, and (ii) a first receiver having a second secondary laser different from the first secondary laser and injection locked to the same center frequency of the single longitudinal mode, wherein the first transmitter is configured to adhere a first input data stream onto an optical spectrum centered at the injection locked frequency and output a first laser modulated data stream over an optical transport medium to a second transceiver downstream of the first transceiver with respect to the optical transport medium, wherein the second transceiver includes a second transmitter and a second receiver, and wherein the improvement comprises:

a second comb generator disposed downstream of the first comb generator with respect to the optical transport medium, wherein the second comb generator is configured to receive a seed tone from the first comb generator, wherein the second comb generator is phase-synchronized to the first comb generator, wherein the second comb generator is further configured to output a second plurality of comb tones substantially conforming to the respective frequencies and constant frequency spacing of the first plurality of comb tones, wherein the second transmitter (i) includes a third secondary laser having a resonator frequency injection locked to the same center frequency of the single longitudinal mode corresponding to the particular comb tone, and (ii) is configured to adhere a second input data stream onto the same optical spectrum centered at the injection locked frequency and output a second laser modulated data stream over the optical transport medium upstream to the first transceiver, such that the first laser modulated data stream uses the same optical spectrum as the second laser modulated data stream, and wherein the second receiver includes a fourth secondary laser different from the third secondary laser.

2. The network of claim 1, wherein the primary laser source includes an external cavity laser (ECL).

3. The network of claim 1, wherein at least one of the secondary lasers includes at least one of an LED, a Fabry Perot laser diode (FPLD), and a vertical-cavity surface-emitting laser (VCSEL).

4. The network of claim 1, wherein the first comb generator includes a first phase modulator and a first Mach Zender modulator (MZM).

5. The network of claim 4, wherein the first comb generator is further configured to drive the first phase modulator and the first MZM with a first radio frequency (RF) signal having a particular RF frequency corresponding to the constant frequency spacing.

6. The network of claim 5, wherein the first phase modulator is configured to receive the primary laser source as an input signal, and wherein the first MZM is configured to output the first plurality of comb tones at the constant frequency spacing.

7. The network of claim 5, wherein the second comb generator includes a second phase modulator and a second MZM.

8. The network of claim 7, wherein the second comb generator is further configured to drive the second phase modulator and the second MZM with the first RF at the particular RF frequency.

9. The network of claim 7, wherein the second phase modulator is configured to receive the seed tone from the first comb generator as an input signal, and wherein the second MZM is configured to output the second plurality of comb tones at the constant frequency spacing.

10. The network of claim 1, wherein the first transceiver further includes a first receiver configured to utilize the particular comb tone of the first plurality of comb tones as a local oscillator signal at the same injection locked frequency.

11. The network of claim 1, wherein the second receiver is configured to receive, from the second comb generator, the frequency of the single longitudinal mode corresponding to the particular comb tone of the first plurality of comb tones at the same injection locked frequency.

12. An optical communication system, comprising:

a primary laser source;

a first comb generator disposed at a first end of an optical communication medium, and configured to (i) receive the primary laser source as an input signal, and (ii) output a generated first plurality of comb tones having a constant frequency spacing;

a second comb generator disposed at a second end of the optical communication medium opposite the first end, and configured to (i) receive, as an input, a seed tone from the generated first plurality of comb tones, (ii) output a generated second plurality of comb tones at the constant frequency spacing, and (iii) phase synchronize with the first comb generator;

a first transceiver proximate the first comb generator at the first end of the optical communication medium, the first transceiver including a first secondary laser injection locked to a center frequency of a single longitudinal mode of a first comb tone of the first plurality of comb tones; and a second transceiver proximate the second comb generator at the second end of the optical communication medium, wherein the second transceiver includes a second secondary laser injection locked to the center frequency of the single longitudinal mode of the first comb tone, and wherein the first and second transceivers each utilize the same center frequency of the single longitudinal mode for modulation of data within a same in-band optical spectrum centered about the center frequency for transmission to the opposite respective transceiver, wherein the first and second transceivers are configured to extract from the seed tone a local oscillator source for reception from the opposite respective transceiver, and wherein the seed tone is out-of-band with respect to the in-band optical spectrum.

13. The communication system of claim 12, wherein the primary laser source includes an external cavity laser (ECL).

14. The communication system of claim 13, wherein at least one of the first and second secondary lasers includes a Fabry Perot laser diode (FPLD).

15. The communication system of claim 12, comprising a passive optical network (PON) architecture.

16. The communication system of claim 15, wherein the PON architecture is configured for full-duplex (FDX) bidirectional operation between the first and second transceivers.

17. The communication system of claim 12, wherein the optical communication medium is an optical single mode fiber (SMF).

18. The communication system of claim 12, wherein the optical communication medium is a wireless optical medium.

19. The communication system of claim 12, wherein the wireless optical medium implements free space optics (FSO).

* * * * *